United States Patent
Peng et al.

(10) Patent No.: US 10,915,090 B2
(45) Date of Patent: Feb. 9, 2021

(54) SYNCHRONIZED PARALLEL TILE COMPUTATION FOR LARGE AREA LITHOGRAPHY SIMULATION

(71) Applicant: Taiwan Semiconductor Manufacturing Co., Ltd., Hsin-Chu (TW)

(72) Inventors: Danping Peng, Fremont, CA (US); Junjiang Lei, Fremont, CA (US); Daniel Beylkin, San Jose, CA (US); Kenneth Lik Kin Ho, Redwood City, CA (US); Sagar Trivedi, Santa Clara, CA (US); Fangbo Xu, San Jose, CA (US)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 16/889,514

(22) Filed: Jun. 1, 2020

(65) Prior Publication Data

US 2020/0293023 A1 Sep. 17, 2020

Related U.S. Application Data

(62) Division of application No. 15/867,437, filed on Jan. 10, 2018, now Pat. No. 10,671,052.

(Continued)

(51) Int. Cl.
*G06F 30/392* (2020.01)
*G06F 30/30* (2020.01)
(Continued)

(52) U.S. Cl.
CPC .......... *G05B 19/4097* (2013.01); *G03F 1/24* (2013.01); *G03F 1/36* (2013.01); *G03F 1/70* (2013.01);
(Continued)

(58) Field of Classification Search
CPC ........ G06F 30/392; G06F 30/30; G06F 30/33; G06F 2119/18; G06F 2111/20;
(Continued)

(56) References Cited

U.S. PATENT DOCUMENTS 6,223,139 B1 4/2001 Wong et al.
6,777,147 B1 8/2004 Fornseca et al.
(Continued)

*Primary Examiner* — Phallaka Kik
(74) *Attorney, Agent, or Firm* — Haynes and Boone, LLP

(57) ABSTRACT

Examples of synchronized parallel tile computation techniques for large area lithography simulation are disclosed herein for solving tile boundary issues. An exemplary method for integrated circuit (IC) fabrication comprises receiving an IC design layout, partitioning the IC design layout into a plurality of tiles, performing a simulated imaging process on the plurality of tiles, generating a modified IC design layout by combining final synchronized image values from the plurality of tiles, and providing the modified IC design layout for fabricating a mask. Performing the simulated imaging process comprises executing a plurality of imaging steps on each of the plurality of tiles. Executing each of the plurality of imaging steps comprises synchronizing image values from the plurality of tiles via data exchange between neighboring tiles.

20 Claims, 10 Drawing Sheets

Related U.S. Application Data

(60) Provisional application No. 62/586,621, filed on Nov. 15, 2017.

(51) Int. Cl.
| | | |
|---|---|---|
| *G06F 30/33* | (2020.01) | |
| *G03F 1/00* | (2012.01) | |
| *G05B 19/4097* | (2006.01) | |
| *G03F 1/70* | (2012.01) | |
| *G03F 1/36* | (2012.01) | |
| *G03F 1/24* | (2012.01) | |
| G06F 111/20 | (2020.01) | |
| G06F 119/18 | (2020.01) | |

(52) U.S. Cl.
CPC .. *G06F 30/392* (2020.01); *G05B 2219/35012* (2013.01); *G05B 2219/45027* (2013.01); *G05B 2219/45028* (2013.01); *G05B 2219/45031* (2013.01); *G06F 2111/20* (2020.01); *G06F 2119/18* (2020.01)

(58) Field of Classification Search
CPC ...... G05B 19/4097; G05B 2219/45027; G05B 2219/45028; G05B 2219/35012; G05B 2219/45031; G03F 1/70; G03F 1/36; G03F 1/24
USPC ....... 716/55, 54, 51, 119; 382/144, 145, 154
See application file for complete search history.

(56) References Cited

U.S. PATENT DOCUMENTS

| | | | |
|---|---|---|---|
| 7,487,492 B1* | 2/2009 | Singhal | G06F 30/398 |
| | | | 716/54 |
| 7,752,594 B2* | 7/2010 | Takeda | G01N 21/956 |
| | | | 716/51 |
| 7,975,244 B2 | 7/2011 | Mukherjee et al. | |
| 8,762,900 B2 | 6/2014 | Shin et al. | |
| 8,796,666 B1 | 8/2014 | Huang et al. | |
| 8,812,999 B2 | 8/2014 | Liu et al. | |
| 8,850,366 B2 | 9/2014 | Liu et al. | |
| 8,898,599 B2 | 11/2014 | Liu et al. | |
| 8,906,595 B2 | 12/2014 | Liu et al. | |
| 8,910,093 B2 | 12/2014 | Flagello | |
| 8,954,899 B2 | 2/2015 | Wu et al. | |
| 9,093,530 B2 | 4/2015 | Huang et al. | |
| 9,367,655 B2 | 6/2016 | Shih et al. | |
| 9,390,217 B2 | 7/2016 | Wang et al. | |
| 9,548,303 B2 | 1/2017 | Lee et al. | |
| 1,002,519 A1 | 7/2018 | Cao et al. | |
| 2003/0236653 A1 | 12/2003 | Zinn et al. | |
| 2004/0128118 A1 | 7/2004 | Croffie et al. | |
| 2005/0055658 A1 | 3/2005 | Mukherjee et al. | |
| 2005/0257187 A1 | 11/2005 | Gallatin et al. | |
| 2006/0126046 A1 | 6/2006 | Hansen | |
| 2007/0032896 A1 | 2/2007 | Ye | |
| 2007/0061773 A1 | 3/2007 | Ye et al. | |
| 2007/0101303 A1 | 5/2007 | Lien et al. | |
| 2007/0101310 A1* | 5/2007 | Stirniman | G06F 30/39 |
| | | | 716/53 |
| 2007/0195201 A1 | 8/2007 | Yamada | |
| 2008/0059128 A1 | 3/2008 | Tejnil | |
| 2008/0158529 A1 | 7/2008 | Hansen | |
| 2008/0309897 A1* | 12/2008 | Wong | G03F 7/70441 |
| | | | 355/44 |
| 2009/0182448 A1 | 7/2009 | Mansfield et al. | |
| 2009/0319970 A1* | 12/2009 | Park | G06F 30/398 |
| | | | 716/106 |
| 2010/0166289 A1* | 7/2010 | Satake | G03F 7/705 |
| | | | 382/144 |
| 2010/0171031 A1 | 7/2010 | Graur et al. | |
| 2010/0175042 A1 | 7/2010 | Tirapu Azpiroz et al. | |
| 2010/0180251 A1 | 7/2010 | Ye et al. | |
| 2010/0315614 A1 | 12/2010 | Hansen | |
| 2011/0113390 A1 | 5/2011 | Cao et al. | |
| 2011/0176719 A1 | 7/2011 | Inoue et al. | |
| 2012/0066651 A1 | 3/2012 | Pang et al. | |
| 2013/0131857 A1* | 5/2013 | Fan | G03F 7/705 |
| | | | 700/121 |
| 2013/0162688 A1* | 6/2013 | Matsuoka | G06F 3/1415 |
| | | | 345/682 |
| 2013/0254725 A1 | 9/2013 | Parikh | |
| 2013/0262988 A1* | 10/2013 | Nakagawa | G06F 40/103 |
| | | | 715/243 |
| 2013/0339833 A1* | 12/2013 | Chen | G06F 3/1454 |
| | | | 715/220 |
| 2014/0072903 A1 | 3/2014 | Satake et al. | |
| 2014/0272676 A1 | 9/2014 | Satake et al. | |
| 2014/0281965 A1* | 9/2014 | Yamaji | G06F 16/50 |
| | | | 715/708 |
| 2017/0082927 A1 | 3/2017 | Hsu et al. | |
| 2017/0230558 A1 | 8/2017 | Morales et al. | |
| 2017/0270658 A1* | 9/2017 | Kaneko | G06T 7/0004 |
| 2018/0082415 A1 | 3/2018 | Sezginer et al. | |
| 2019/0012820 A1* | 1/2019 | Furuya | H04N 1/00196 |

\* cited by examiner

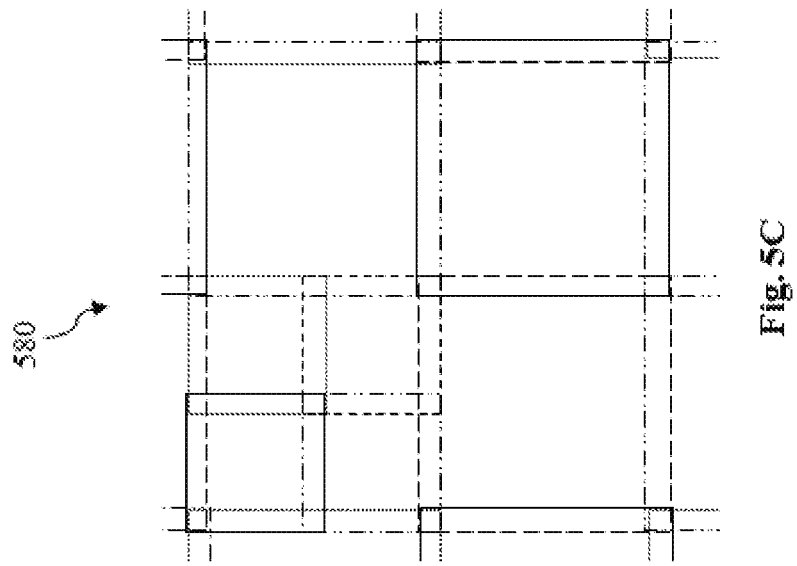
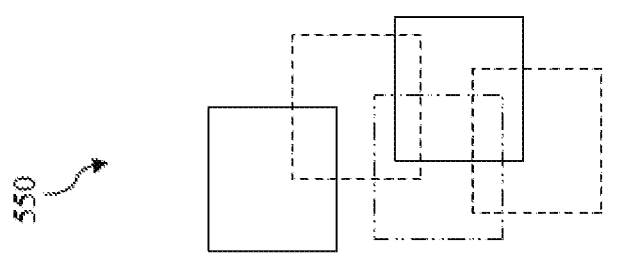
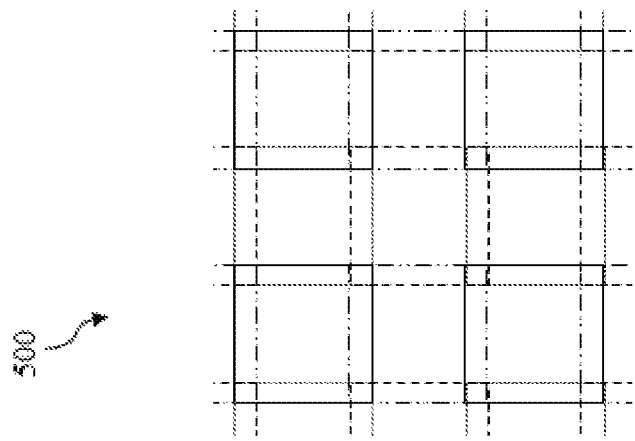

SYNCHRONIZED PARALLEL TILE COMPUTATION FOR LARGE AREA LITHOGRAPHY SIMULATION

This is a divisional application of and claims priority to U.S. patent application Ser. No. 15/867,437 (now U.S. Pat. No. 10,671,052 B2), entitled "Synchronized Parallel Tile Computation for Large Area Lithography Simulation" and filed Jan. 10, 2018, which is a non-provisional application of and claims priority to U.S. Provisional Patent Application Ser. No. 62/586,621, entitled "Synchronized Parallel Tile Computation for Large Area Lithography Simulation" and filed Nov. 15, 2017, the entire disclosures of which are hereby incorporated by reference.

BACKGROUND

The semiconductor device industry has experienced rapid growth. In the course of semiconductor device evolution, the functional density has generally increased while feature size has decreased. This scaling down process provides benefits by increasing production efficiency and lowering associated costs. Such scaling down has also increased the complexity of design and manufacturing these devices.

For example, one technique applied to the design and manufacturing of semiconductor devices is optical proximity correction (OPC). OPC includes applying features that alter the photomask design layout of a semiconductor device in order to compensate for distortions, for example, caused by the diffraction of light through subwavelength features on the photomask, the bandlimiting effect of a lens system, and the chemical process of the photoresist that occur during lithography. Thus, OPC allows circuit patterns on a substrate to conform more closely to an integrated circuit (IC) designer's layout for the semiconductor device. As process nodes shrink, OPC processes and the resultant patterns become more complex. There is also inverse lithography technology (ILT), which may produce complex, curvilinear patterns on a photomask or reticle, rather than Manhattan patterns that are formed via OPC on conventional photomasks or reticles. Unfortunately, even though existing OPC and ILT techniques have been generally adequate for their intended purposes, they have not been entirely satisfactory in all respects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5A is a diagram illustrating a uniform tiling scheme according to various embodiments of the present disclosure.

FIG. 5B is a diagram illustrating a staggered tiling scheme according to various embodiments of the present disclosure.

FIG. 5C is a diagram illustrating an adaptive tiling scheme according to various embodiments of the present disclosure.

DETAILED DESCRIPTION

Figure 1:
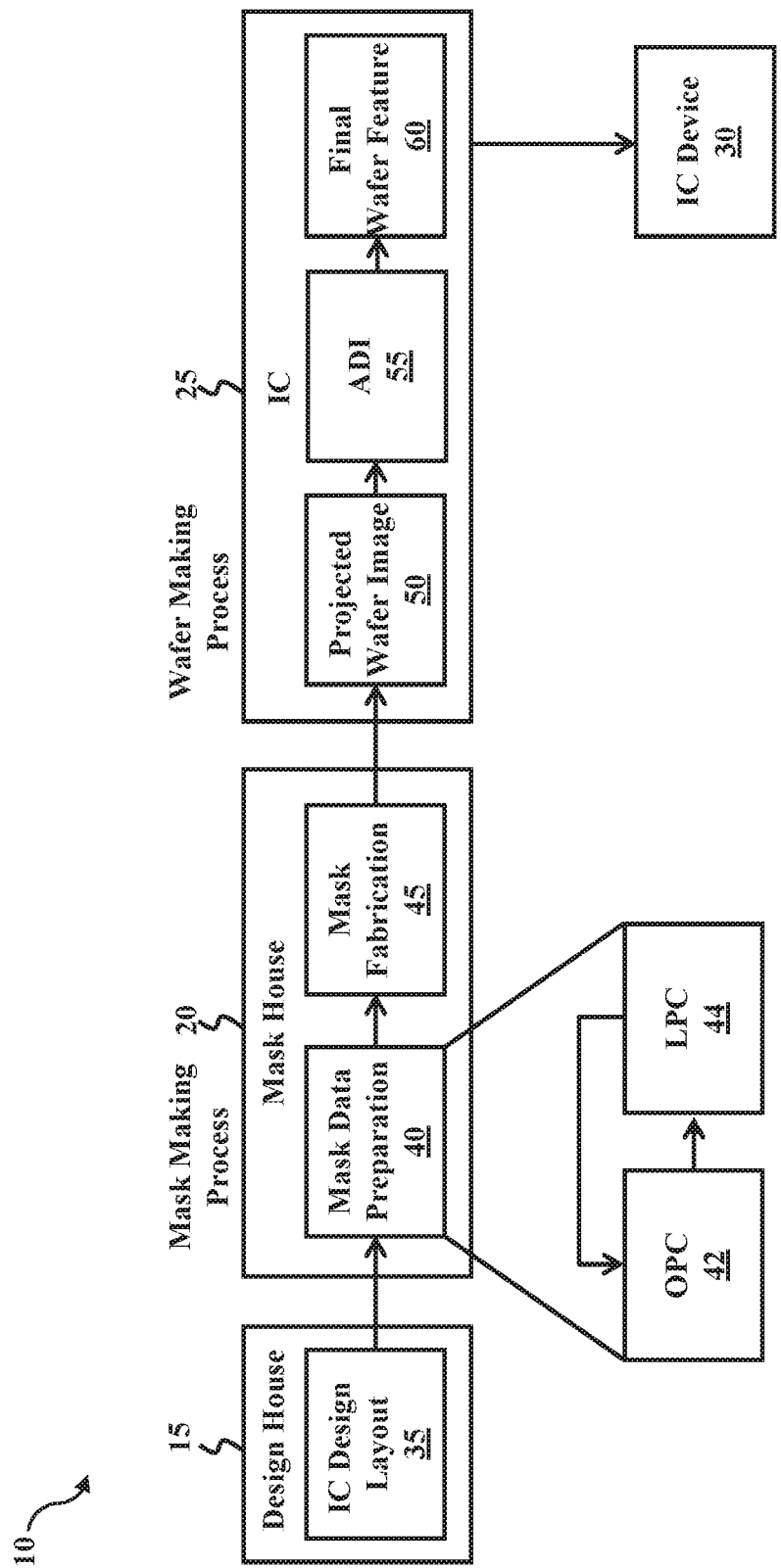
FIG. 1 is a block diagram of an embodiment of an integrated circuit (IC) manufacturing system according to various embodiments of the present disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature "over" or "on" a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As semiconductor fabrication progresses to increasingly small technology nodes, various techniques have been employed to help achieve the small device sizes. One example of such technique is computational lithography, which aims to simulate the lithography process before actually fabricating a photomask. The simulation helps optimize pattern geometries on the photomask. With increasingly small technology nodes, more devices and features are packed into the same area of IC design layout. Shorter light wavelengths are used in lithography processes to help realize smaller technology nodes. Therefore, in applications of computational lithography, such as Optical Proximity Correction (OPC) and Inverse Lithography Technology (ILT), a large area of IC layout is divided into small tiles for distributed processing. Distributed processing helps lithography simulation applications due to limited physical memory associated with a single central processing unit (CPU). Lithography simulation may be performed more effectively and more efficiently with parallel processing by multiple CPUs located on multiple machines.

Conventional parallel computing solutions and tiling schemes frequently result in low simulation area efficiency. Further, special care is required to prevent inconsistent computational results at the tile boundaries, which cause difficulties when the processed tiles are then stitched back together to form a complete solution for the whole mask layout. For example, in some mask correction algorithms, such as OPC and ILT, an iterative solver is applied independently within each tile in an ordered fashion. The information flow between neighboring tiles goes one-way only: each tile is initialized (near its boundary) based on the solutions of its predecessors, and the tile passes on its own results (near its boundary) to its successors. If a particular tile is allowed to change a mask solution from its predecessors, in general this will lead to boundary inconsistencies. Boundary stitching is done at the very end after solutions have already diverged, and special techniques are required to correct boundary inconsistencies. Alternatively, a tile can freeze the solution from its predecessors, but this will limit the degrees of freedom the tile has in computing an optimized mask pattern. Moreover, in order to simulate a tile accurately, it is useful to simulate a larger surrounding region (sometimes referred to as a halo). In certain conventional OPC and ILT practices, the halo can be quite large (and frequently larger than would seem to be necessary based on model considerations), which results in low simulation area efficiency. Overall, conventional methods and practices are expected to be insufficient, especially for developing most advanced nodes (5 nm and beyond).

The present disclosure provides a new parallel computing architecture for large area lithography simulation that naturally solves tile boundary issues by preventing them from happening in an intrinsic manner. Specifically, a manager machine is used to execute overall computing algorithms while multiple worker machines are used in local computation of different tiles. The workers exchange their intermediate computational results with neighboring tiles, which are appropriately stitched together. Within each iteration of an iterative process, such as OPC and ILT, such an exchange of information can occur at every image simulation step in order to synchronize the simulation results. The continuous information exchange intrinsically avoids the tile boundary stitching issues that arise in conventional practices.

The parallel computing architecture disclosed herein treats an integrated circuit (IC) design layout (or a large area thereof that is larger than usual tiles) as a whole. The computing architecture still uses an underlying tiling scheme but smoothly and symmetrically combines simulation results from each tile into a single larger simulation. A lithography simulation process may have multiple steps that produce intermediate results, such as optical images, various resist images, and wafer contours. The disclosed computing architecture stages the computation in such a manner that the intermediate results can be synchronized before simulation proceeds to the next step, thereby effectively eliminating tile boundary inconsistencies at each step. Functionally, such synchronization is equivalent to performing OPC/ILT on the single, larger area of IC design layout. Therefore, the present disclosure provides an effective and efficient solution to lithography simulation for a large area of IC design layout. Such a solution can be used for lithography simulation and computation where an iterative solver (e.g., OPC and ILT) is used in a parallel computing environment. The various embodiments of the present disclosure are discussed in more detail with reference to FIGS. 1-10.

FIG. 1 is a block diagram of an IC manufacturing system 10, along with an IC manufacturing flow associated with IC manufacturing system 10, according to various embodiments of the present disclosure. IC manufacturing system 10 includes a plurality of entities—such as a design house (or design team, or design shop) 15, a mask house 20, and an IC manufacturer 25 (e.g., an IC fab)—that interact with one another in design, development, and manufacturing cycles and/or services related to manufacturing an IC device 30. The entities are connected by a communication network, which may be a single network or a variety of different networks, such as an intranet and/or Internet, and may include wired and/or wireless communication channels. Each entity may interact with other entities and may provide services to and/or receive services from the other entities. One or more of design house 15, mask house 20, and IC manufacturer 25 may be owned by a single large company, and may even coexist in a common facility and use common resources. It should be understood that figures herein including FIG. 1 have been simplified in the interest of clarity. Therefore, the figures may include additional features, processes, and/or operations that exist before, between, and/or after those explicitly shown.

Design house 15 generates an IC design layout 35 (also referred to as an IC design pattern). IC design layout 35 includes various circuit features (represented by geometrical shapes) designed for an IC product based on specifications of the IC product to be manufactured. The circuit features correspond to geometrical features formed in various material layers (such as metal layers, dielectric layers, and/or semiconductor layers) that combine to form IC features (components) of the IC product, such as IC device 30. For example, a portion of IC design layout 35 includes various IC features to be formed in a substrate (e.g., a silicon substrate) and/or in various material layers disposed on the substrate. The various IC features can include an active region, a gate feature (e.g., a gate dielectric and/or a gate electrode), a source/drain feature, an interconnection feature, a bonding pad feature, other IC feature, or combinations thereof. In some examples, assist features are inserted into IC design layout 35 to provide imaging effects, process enhancements, and/or identification information. A geometry proximity correction (GPC) process, similar to an optical proximity correction (OPC) process used for optimizing mask patterns (mask layouts), may generate the assist features based on environmental impacts associated with IC fabrication, including etching loading effects, patterning loading effects, and/or chemical mechanical polishing (CMP) process effects.

Design house 15 implements a proper design procedure to form IC design layout 35. The design procedure may include logic design, physical design, place and route, or combinations thereof. IC design layout 35 is presented in one or more data files having information of the circuit features (geometrical patterns). In an example, IC design layout 35 is expressed in a Graphic Database System file format (such as GDS or GDSII). In another example, IC design layout 35 is expressed in another suitable file format, such as Open Artwork System Interchange Standard file format (such as OASIS or OAS).

Mask house 20 uses IC design layout 35 to manufacture masks, which are used for fabricating various layers of IC device 30 according to IC design layout 35. A mask (sometimes referred to as a photomask or reticle) is a patterned substrate used in a lithography process to pattern a wafer, such as a semiconductor wafer. Mask house 20 performs mask data preparation 40, where IC design layout 35 is translated into a form that may be written by a mask writer to generate a mask. For example, IC design layout 35 is translated into machine readable instructions for a mask writer, such as an electron-beam (e-beam) writer. Mask data preparation 40 generates a mask pattern (mask layout) that corresponds with a target pattern defined by the design layout 35. The mask pattern is generated by fracturing the target pattern of IC design layout 35 into a plurality of mask features (mask regions) suitable for a mask-making lithography process, such as an e-beam lithography process. The fracturing process may be implemented according to various factors, such as IC feature geometry, pattern density differences, and/or critical dimension (CD) differences, and the mask features are defined based on methods implemented by the mask writer for printing mask patterns.

In some examples, where an e-beam writer uses a variable-shaped beam (VSB) method for printing mask patterns, a mask pattern may be generated by fracturing IC design layout 35 into polygons (such as rectangles or trapezoids). A corresponding mask shot map may include exposure shot information for each polygon. For example, at least one corresponding exposure shot, including an exposure dose, an exposure time, and/or an exposure shape, is defined for each polygon.

In some examples, where an e-beam writer uses a character projection (CP) method for printing mask patterns, a mask pattern may be generated by fracturing IC design layout 35 into characters (typically representing complex patterns) that correspond with a stencil used by the e-beam writer. A corresponding mask shot map may include exposure shot information for each character. For example, at least one corresponding exposure shot, including an exposure dose, an exposure time, and/or an exposure shape, is defined for each character. In such examples, any portions of fractured IC design layout 35 that do not match characters in the stencil may be printed using the VSB method.

Mask data preparation 40 can include various processes for optimizing the mask pattern, such that a final pattern formed on a wafer (often referred to as a final wafer feature) by a lithography process using a mask fabricated from the mask pattern exhibits enhanced resolution and precision. For example, mask data preparation 40 includes OPC 42, which uses lithography enhancement techniques to compensate for image distortions and errors, such as those that arise from diffraction, interference, and/or other process effects. OPC 42 can add assist features, such as scattering bars, serifs, and/or hammerheads, to the mask pattern according to optical models or optical rules in order to enhance resolution and precision of a final pattern on a wafer. In some examples, the assist features can compensate for line width differences that arise from different densities of surrounding geometries. In some examples, the assist features can prevent line end shortening and/or line end rounding. OPC 42 may further correct e-beam proximity effects and/or perform other optimization features.

Although not shown in FIG. 1, one technique that may be used in conjunction with OPC is inverse lithography technology (ILT), which computes a mask pattern using the entire area of a design rather than just its edges. While OPC may be restricted to Manhattan or otherwise simple manipulation of the edges of a photomask, ILT considers a much richer representation of the mask, for example, as a pixelated image. Commonly, ILT includes a process to feed an error (the difference between a simulated wafer pattern and a designer's layout) back into the simulation in "reverse" order (analogous to so-called backpropagation in machine learning) to compute a gradient, which (or some function of it) is then fed into the iterative correction of the mask. While ILT may in some cases produce unintuitive mask patterns, ILT may be used to fabricate masks having high fidelity and/or substantially improved depth-of-focus and exposure latitude, thereby enabling printing of geometric patterns that may otherwise be unattainable. In some embodiments, an ILT process may be referred to as a type of model-based mask correction process.

In some examples, mask data preparation 40 may use a mask rule check (MRC) process to check the mask pattern after undergoing an OPC process, where the MRC process uses a set of mask creation rules. The mask creation rules can define geometric restrictions and/or connectivity restrictions to compensate for variations in IC manufacturing processes.

In some examples, mask data preparation 40 can include a lithography process check (LPC) 44, which simulates wafer making processes that will be implemented by IC manufacturer 25 to fabricate IC device 30. In some examples, based on a generated mask pattern, LPC 44 simulates a mask image using various LPC models (or rules), which may be derived from actual processing parameters implemented by IC fab 25. The processing parameters may include parameters associated with various processes of the IC manufacturing cycle, parameters associated with tools used for manufacturing IC device 30, and/or other aspects of the manufacturing process. LPC 44 may take into account various factors, such as image contrast, depth of focus ("DOF"), mask error sensitivity or Mask Error Enhancement Factor ("MEEF"), other suitable factors, or combinations thereof. After a simulated device has been created by LPC 44, if the simulated device is not close enough in shape to satisfy pre-set design rules, certain steps in mask data preparation 40, such as OPC 42 and MRC, may be repeated to further refine the IC design layout. It should be understood that mask data preparation 40 has been simplified in the interest of clarity, and mask data preparation 40 can include additional features, processes, and/or operations for modifying the IC design layout to compensate for limitations in lithographic processes used by IC fab 25.

In addition to performing mask data preparation 40, mask house 20 also performs mask fabrication 45, where a mask (e.g., mask 222 described below in FIG. 2) is fabricated according to the mask pattern generated by mask data preparation 40. In some examples, the mask pattern is modified during mask fabrication 45 to comply with a particular mask writer and/or mask manufacturer. During mask fabrication 45, a mask making process is implemented that fabricates a mask based on the mask pattern (mask layout). A mask may include a mask substrate and a patterned mask layer, where the patterned mask layer includes a final (real) mask pattern. The final mask feature, such as a mask contour, corresponds with the mask pattern (which in turn corresponds with the target pattern provided by IC design layout 35).

In some examples, the mask is a binary mask. For example, an opaque material layer (such as chromium) may be formed over a transparent mask substrate (such as a fused quartz substrate or calcium fluoride ($CaF_2$)), and the opaque material layer may be patterned based on the mask pattern to form a mask having opaque regions and transparent regions. In some examples, the mask is a phase shift mask (PSM) that can enhance imaging resolution and quality, such as an attenuated PSM or alternating PSM. For example, a phase shifting material layer (such as molybdenum silicide (MoSi) or silicon oxide ($SiO_2$)) may be formed over a transparent mask substrate (such as a fused quartz substrate or calcium fluoride ($CaF_2$)), and the phase shifting material layer may be patterned to form a mask having partially transmitting, phase shifting regions and transmitting regions that form the mask pattern. In another example, the phase shifting material layer is a portion of the transparent mask substrate, such that the mask pattern is formed in the transparent mask substrate.

In some examples, the mask is an extreme ultraviolet (EUV) mask. For example, a reflective layer may be formed over a substrate, an absorption layer may be formed over the reflective layer, and the absorption layer (such as a tantalum boron nitride (TaBN)) may be patterned to form a mask having reflective regions that form the mask pattern. The substrate may include a low thermal expansion material (LTEM), such as fused quartz, $TiO_2$ doped $SiO_2$, or other suitable low thermal expansion materials. The reflective layer may include multiple layers formed on the substrate, where the multiple layers include a plurality of film pairs, such as molybdenum-silicide (Mo/Si) film pairs, molybdenum-beryllium (Mo/Be) film pairs, or other suitable material film pairs configured for reflecting EUV radiation (light). The EUV mask may further include a capping layer (such as ruthenium (Ru)) disposed between the reflective layer and the absorption layer. Alternatively, another reflective layer is formed over the reflective layer and patterned to form an EUV phase shift mask.

Mask fabrication 45 may use various lithography processes for fabricating a mask. For example, a mask making process may include a lithography process, which involves forming a patterned energy-sensitive resist layer on a mask material layer and transferring a pattern defined in the patterned resist layer to a mask patterning layer. The mask material layer may be an absorption layer, a phase shifting material layer, an opaque material layer, a portion of a mask substrate, and/or other suitable mask material layer. In some examples, forming the patterned energy-sensitive resist layer includes forming an energy-sensitive resist layer on the mask material layer (e.g., via spin coating), performing a charged particle beam exposure process, and performing a developing process. The charged particle beam exposure process directly "writes" a pattern into the energy-sensitive resist layer using a charged particle beam, such as an electron beam or an ion beam. Since the energy-sensitive resist layer is sensitive to charged particle beams, exposed portions of the energy-sensitive resist layer chemically change, and exposed (or non-exposed) portions of the energy-sensitive resist layer are dissolved during the developing process depending on characteristics of the energy-sensitive resist layer and characteristics of a developing solution used in the developing process. After development, the patterned resist layer includes a resist pattern that corresponds with the mask pattern. The resist pattern is then transferred to the mask material layer by any suitable process to form a final mask feature in the mask material layer. For example, the mask making process may include performing an etching process that removes portions of the mask material layer, where the etching process uses the patterned energy-sensitive resist layer as an etch mask during the etching process. After the etching process, a lithography process may remove the patterned energy-sensitive resist layer from the mask material layer, for example, using a resist stripping process.

IC manufacturer 25 (also referred to as IC fab 25), such as a semiconductor foundry, uses one or more masks fabricated by mask house 20 to fabricate IC device 30. For example, a wafer making process may use a mask to fabricate a portion of IC device 30 on a wafer. In some examples, IC manufacturer 25 performs a wafer making process numerous times using various masks to complete fabrication of IC device 30.

Figure 2:
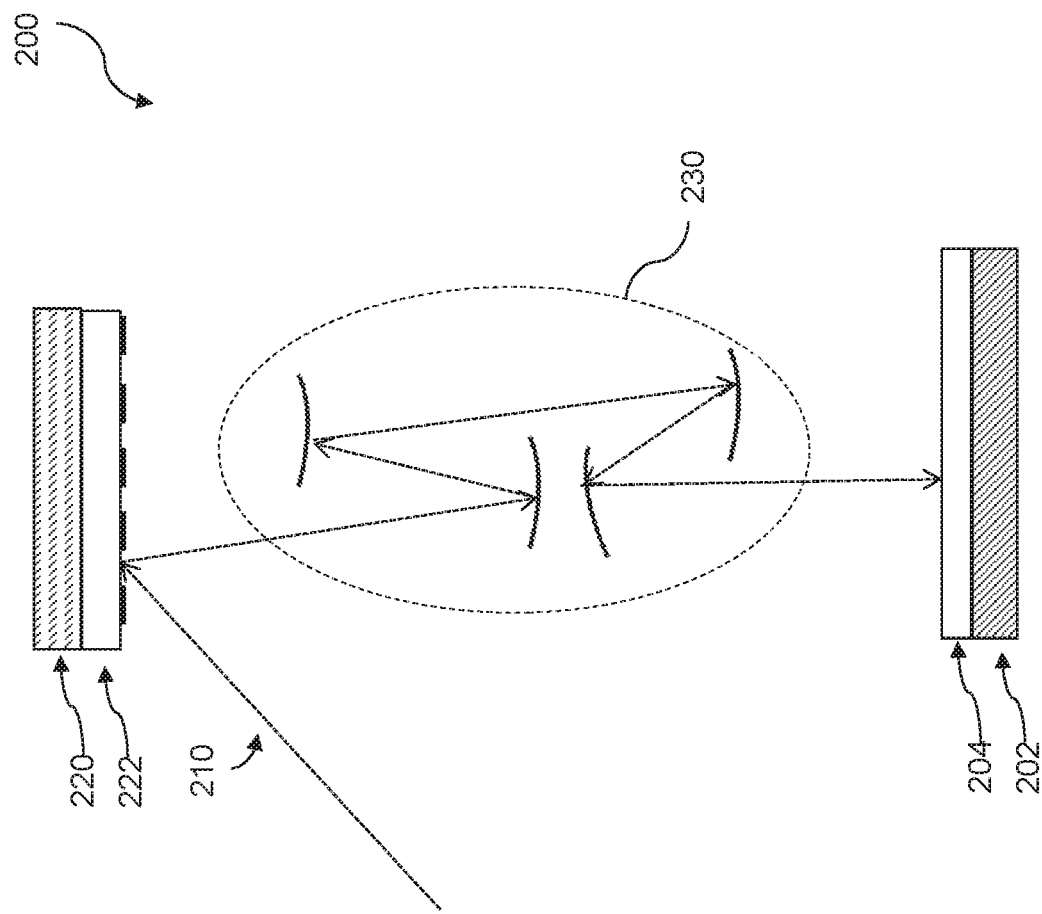
FIG. 2 is a schematic view of a lithography system according to various embodiments of the present disclosure.

FIG. 2 is a schematic view of a lithography system 200, constructed in accordance with some embodiments. For example, lithography system 200 may be used by IC manufacturer 25 to fabricate IC device 30. Lithography system 200 is designed to expose a semiconductor wafer 202 by radiation or light 210. Semiconductor wafer 202 may be a silicon wafer or other type of wafer used for fabricating IC device 30. Semiconductor wafer 202 may include a resist layer 204, which is a material sensitive to light 210. Lithography system 200 employs a radiation source to generate light 210, such as extreme ultraviolet (EUV) light having a wavelength ranging between about 1 nm and about 100 nm. Lithography system 200 also includes a mask stage 220 configured to secure a mask 222, which may be fabricated by mask house 20. In some embodiments, mask stage 220 includes an electrostatic chuck (e-chuck) to secure mask 222. As shown in FIG. 2, when lithography system 200 is a EUV lithography system, mask 222 is a reflective mask. Lithography system 200 may also include a projection optics box (POB) 230 for imaging patterns on mask 222 to semiconductor substrate 210. The POB 230 includes reflective optics for directing light 40 from mask 222, carrying the image of patterns defined on mask 222. Although not shown in FIG. 2, similar principles may be used to fabricate IC device 30 using deep UV (DUV) light having a wavelength of about 193 nm or greater.

Depending on the IC fabrication stage, semiconductor wafer 202 can include various material layers and/or IC features (e.g., doped features, gate features, source/drain features, and/or interconnect features) when undergoing the wafer making process. Patterns may be formed in resist layer 204 and transferred to a wafer material layer, which may be a dielectric layer, a semiconductor layer, a conductive layer, a portion of a substrate, and/or other suitable wafer material layer. Forming a patterned resist layer in semiconductor wafer 202 can include forming resist layer 204 on a substrate (e.g., by spin coating), performing a pre-exposure baking process, performing an exposure process using mask 222 (including mask alignment), performing a post-exposure baking process, and performing a developing process. During the exposure process, resist layer 204 is exposed to light 210 (such as ultraviolet (UV) light, deep UV (DUV) light, or extreme UV (EUV) light). Mask 222 blocks, transmits, or reflects light 210 to resist layer 204 depending on a final mask feature of the mask and/or mask type (e.g., binary mask, phase shift mask, or EUV mask), such that an image is projected onto resist layer 204 that corresponds with the final mask feature. This image is referred to herein as a projected wafer image 50. Since resist layer 204 is sensitive to light 210, exposed portions of resist layer 204 chemically change, and exposed (or non-exposed) portions of resist layer 204 are dissolved during the developing process depending on characteristics of resist layer 204 and characteristics of a developing solution used in the developing process. After development, resist layer 204 includes a resist pattern that corresponds with the final mask feature.

Referring back to FIG. 1, an after development inspection (ADI) 55 may be performed to capture information associated with the resist pattern, such as critical dimension uniformity (CDU) information, overlay information, and/or defect information. Ideally, final wafer feature 60 matches the target pattern defined by IC design layout 35. However, due to various factors associated with the mask making process and the wafer making process, a final mask feature formed on a mask often differs from a mask pattern (generated from the target pattern defined by IC design layout 35), causing final wafer feature 60 formed on the wafer to differ from a target pattern. For example, mask writing blur (such as e-beam writing blur) and/or other mask-making factors may cause variances between the final mask feature and the mask pattern, which in turn causes variances between final wafer feature 60 and the target pattern. Various factors associated with the wafer making process (such as resist blur, mask diffraction, projection imaging resolution, acid diffusion, etching bias, and/or other wafer making factors) further exacerbate variances between final wafer feature 60 and the target pattern.

To minimize or eliminate such variances, computational lithography helps enhance and optimize the mask making process and the wafer making process. Computational lithography comprises a set of techniques that implement computationally-intensive physical models and/or empirical models to predict and optimize IC feature patterning. The physical models and/or the empirical models are based on phenomena that affect lithographic process results, such as imaging effects (e.g., diffraction and/or interference) and/or resist chemistry. IC manufacturing system 10 can implement such techniques to generate optimal settings for the mask making process (often referred to as mask optimization) and/or the wafer making process (often referred to as source optimization, wave front engineering, and/or target optimization). For example, IC manufacturing system 10 can implement OPC, MRC, LPC, and/or ILT techniques to generate a shape for a final mask feature of a mask fabricated by mask house 20 that optimizes projected wafer image 50 so that projected wafer image 50 may correspond as closely as possible with the target pattern of IC design layout 35.

Figure 3:
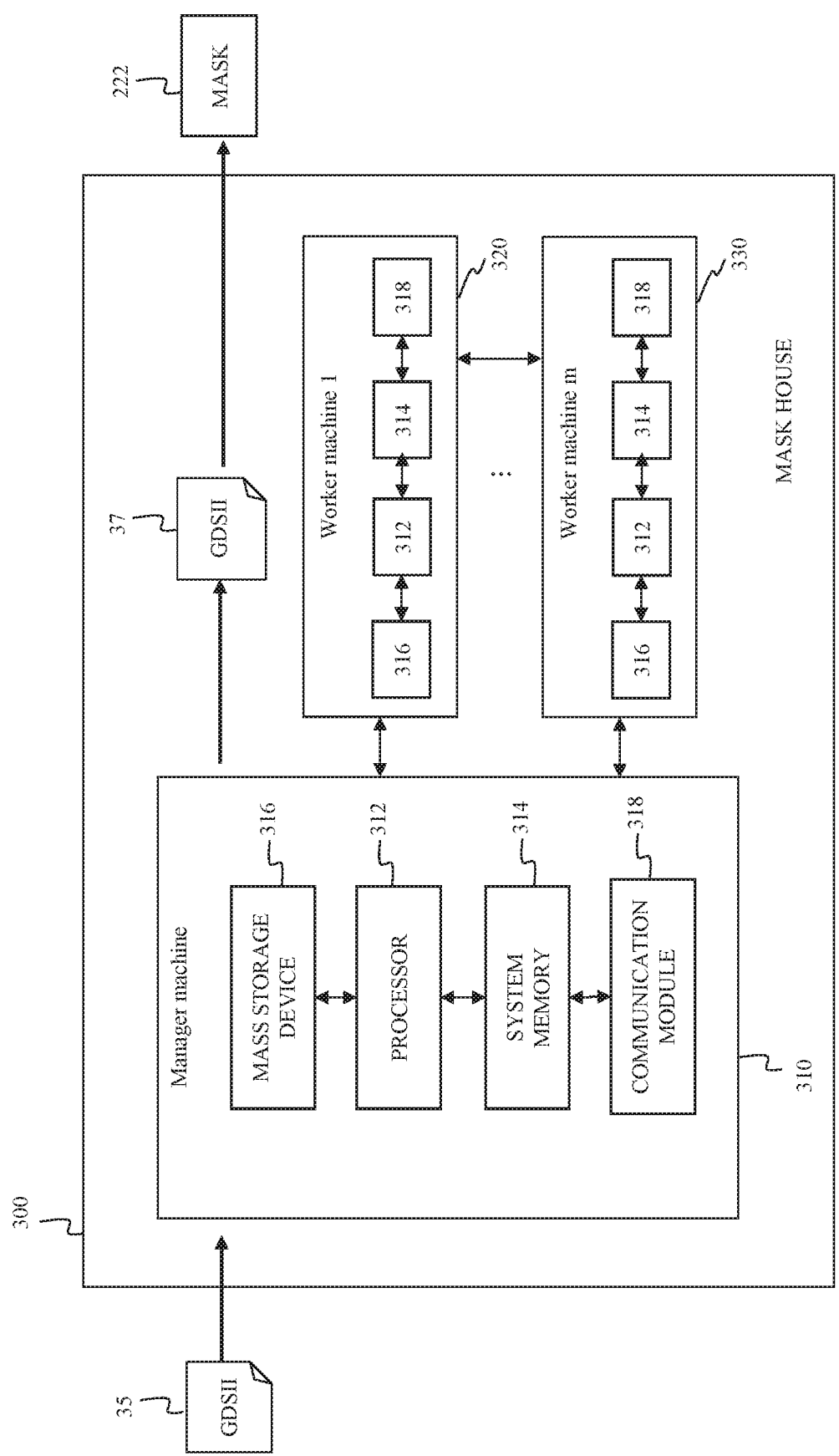
FIG. 3 is a block diagram of a mask design system according to various embodiments of the present disclosure.

FIG. 3 is a block diagram of a mask design system 300 according to various embodiments of the present disclosure. Mask design system 300 may be part of mask house 20 shown in FIG. 1, and more specifically, may be operable to perform the functionality described in association with mask data preparation 40 of FIG. 1. In operation, mask design system 300 is configured to manipulate IC design layout 35 according to a variety of pre-set conditions (e.g., design rules, IC fabrication capability, and limitations) before it is transferred to mask 222 by mask fabrication 45. For example, mask data preparation 40, including OPC, ILT, MRC, and/or LPC, may be implemented as software instructions executing on mask design system 300. In such an embodiment, mask design system 300 receives an IC design layout 35 (e.g., as a GDSII file) from design house 20. After mask data preparation 40 is complete, mask design system 300 provides a modified IC design layout 37 to mask fabrication 45 for fabricating mask 222.

Mask design system 300 may include one or more computer devices or machines. As discussed above, with increasingly small technology nodes, more devices and features are packed into the same area of an IC design layout. Therefore, in applications of computational lithography, such as OPC and ILT, a large area of IC layout is divided into small tiles for distributed processing. Distributed processing helps lithography simulation due to limited physical memory associated with a single CPU. Lithography simulation may be performed more quickly and more efficiently with parallel processing by multiple CPUs located on multiple machines. In an embodiment, mask design system 300 includes a plurality of machines including a manager machine 310 and multiple worker machines such as 320 and 330. Each machine is an information handling system such as a computer, server, workstation, or other suitable device. The plurality of machines may reside at the same location (e.g., as units of a larger mask design system) or at different locations, and may interact with one another through communication means.

Each manager or worker machine includes a processor 312, a system memory 314, a mass storage device 316, and a communication module 318. Processor 312 may include one or more CPUs. System memory 314 provides processor 312 with non-transitory, computer-readable storage to facilitate execution of computer instructions by processor 312. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on mass storage device 316. Examples of mass storage devices may include hard discs, optical disks, magneto-optical discs, solid-state storage devices, and/or a variety other mass storage devices. Communication module 318 is operable to communicate information such as IC design layout files with other components in mask design system 300 or in IC manufacturing system 10, such as design house 20. Examples of communication modules may include Ethernet cards, 802.11 WiFi devices, cellular data radios, and/or other suitable devices.

The new parallel computing architecture shown in FIG. 3 may naturally solve tile boundary issues for large area lithography simulation by preventing tile boundary inconsistencies from happening in an intrinsic manner. In an embodiment, manager machine 310 is used to execute overall computing algorithms while multiple worker machines including 320 and 330 are used in local computation of different tiles. Worker machines exchange their intermediate computational results with neighboring tiles, which are appropriately stitched together. Within each iteration of an iterative process, such as OPC and ILT, such an exchange of information can occur at every image simulation step to synchronize simulation results. The continuous information exchange intrinsically avoids the tile boundary stitching issues that arise in conventional practices. More details of such synchronized parallel tile computation schemes are described in regard to FIG. 4.

Figure 4:
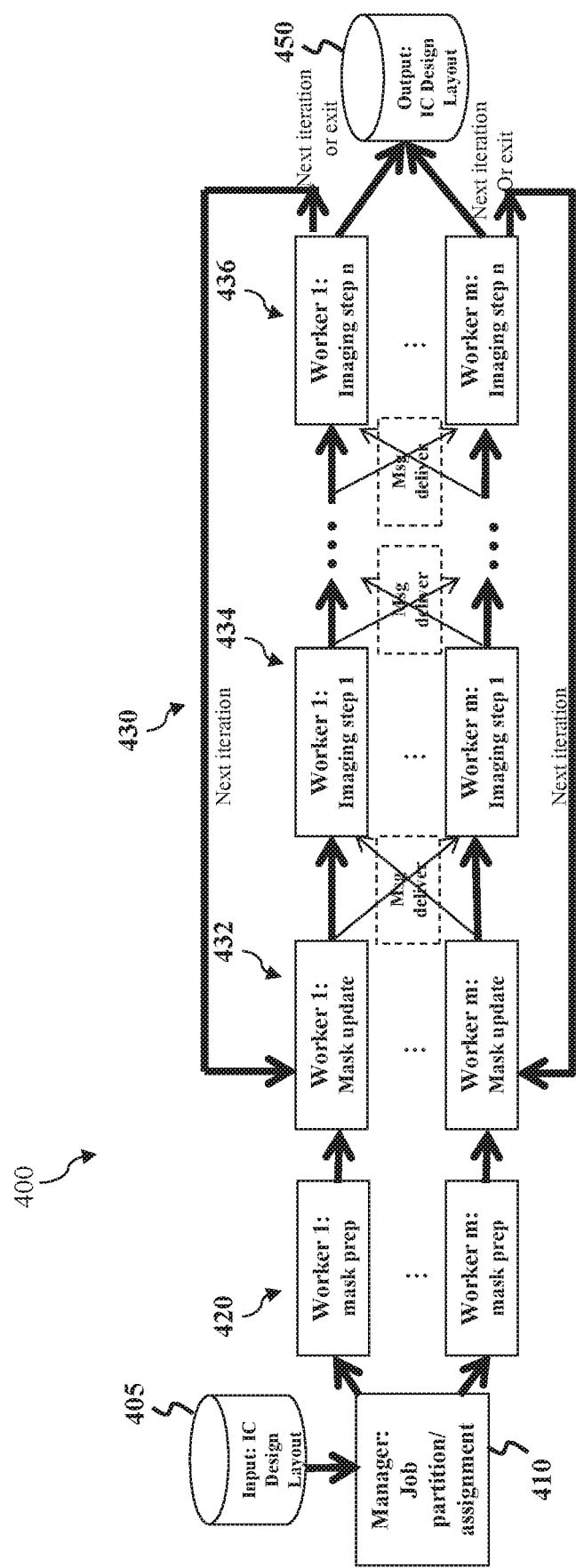
FIG. 4 is a flowchart of a computational lithography method according to various embodiments of the present disclosure.

FIG. 4 is a flowchart of a computational lithography method 400 according to various embodiments of the present disclosure. Computational lithography method 400 may be implemented by IC manufacturing system 10 of FIG. 1, where design house 15, mask house 20, and/or IC manufacturer 25 can perform (or collaborate to perform) method 400 to manufacture IC device 30. For example, method 400 may be implemented by mask house 20 as a computational lithography process, which uses lithography enhancement techniques to compensate for image distortions and errors, such as those arising from diffraction, interference, or other process effects. Method 400 may be jointly implemented by manager machine 310 and worker machines of mask design system 300. FIG. 4 has been simplified for the sake of clarity. It is understood that additional steps can be provided before, during, and after method 400 and that some of the steps described can be replaced or eliminated for other embodiments of method 400. Unless otherwise noted, steps in method 400 may be performed in any order including concurrently.

In step 405, a manager machine (e.g., manager machine 310) receives an IC design layout, such as IC design layout 35. The IC design layout is presented in one or more data files (e.g., GDSII file format) having information of a target pattern. The IC design layout may be an original design layout or a version processed therefrom. The IC design layout includes various IC features (represented by geometrical shapes) designed for an IC product to be manufactured, for example, by IC manufacturing system 10. The IC features may be formed in various material layers (e.g., metal layers, dielectric layers, and/or semiconductor layers) that combine to form IC features of the IC product. In some examples, the IC features specify mask features on a mask (e.g., mask 222) for selectively exposing a resist layer (e.g., resist layer 204) to radiation energy (e.g., light 210). The IC design layout may contain a relatively large area that warrants partition into smaller tiles for distributed processing. Such an area may have any suitable shape and/or size. The size of such an area may depend on various factors such as computation capabilities of the manager machine. For example, a length or a width of the IC design layout may range from 50 micrometers (μm) to 1 millimeter (mm). In some embodiments, the IC design layout include an area of about 200×200 square micrometers (μm^2), 100×300 μm^2, 28×32 μm^2, etc.

In step 410, the manager machine divides or partitions the IC design layout (or an area thereof) into a plurality of smaller tiles. In some embodiments, an IC design layout comprises a region of interest and a surrounding freeze region, and the region of interest is partitioned into tiles. Each tile represents a job unit, which is a smaller area of the IC design layout, to be assigned to a worker machine for parallel computing. Each tile may have any suitable shape (e.g., rectangle or square) and/or size. For example, a large area of design layout (e.g., 200×200 μm^2) may be partitioned by a manager machine into a number of tiles (e.g., 16 tiles each with a size of 50×50 μm^2). In terms of relative position within the IC design layout, each tile may be defined or identified by the coordinates of its four corners. In terms of image content, each tile may have a plurality of pixels (or points or dots) with image values, as further described below with respect to FIG. 6. After partitioning, each tile is assigned to a worker machine (e.g., worker machine 320 or 330) that will be used to support local calculations for the manager machine. Moreover, the manager machine sends to each worker machine message delivery instructions defining which points or pixels go to which of the other worker machines interacting with it, thereby enabling the worker machines to exchange information with other worker machines in order to synchronize their simulation results. Note that, if an IC design layout is too big for one manager machine to compute, multiple manager machines may be used to handle the computation load, each interacting with a plurality of worker machines.

In the present disclosure, an IC design layout (or an area thereof) may be partitioned into tiles (this process is sometimes referred to as "tiling") in flexible ways depending on the application. As examples, FIG. 5A is a diagram illustrating a uniform tiling scheme 500, FIG. 5B is a diagram illustrating a staggered tiling scheme 550, and FIG. 5C is a diagram illustrating an adaptive tiling scheme 580. In uniform tiling scheme 500, rectangular tiles have equal sizes and are tightly packed (with or without overlapping areas). FIG. 5A shows nine rectangular tiles (four corner tiles represented by solid-line rectangles and other tiles represented by broken-line rectangles), where each tile partially overlaps its neighboring tiles. Details of different regions associated with each tile are described with respect to FIG. 6. In staggered tiling scheme 550, rectangular tiles may have equal or different sizes, and may or may not overlap with one another in certain areas of the layout. FIG. 5B shows five rectangular tiles, two represented by solid-line rectangles and three represented by broken-line rectangles. In some embodiments, staggered tiling scheme 550 is used to simulate non-standard (non-rectangular) regions as efficiently as possible (e.g., by not simulating certain unnecessary regions). In adaptive tiling scheme 580, tiles are not uniformly distributed in the layout; rather, the shape, size, and location of tiles may be adapted based on IC features in the layout. As shown in FIG. 5, if needed, certain tiles may be further divided into smaller areas (called "subtiles"). One advantage of adaptive tiling scheme 580 over uniform tiling scheme 500 is the option to omit some of the subtiles from the computation. For example instead of computing one 16×16 μm^2 tile, one may compute two or three 8×8 μm^2 subtiles (and omitting two or one), which may improve efficiency. It should be understood that other tiling schemes, though not shown in FIGS. 5A-5C, are also contemplated within the scope of the present disclosure. Moreover, it should be understood that, since a tile represents a job unit assigned to a worker machine for computation, the concept of tile may be captured or otherwise expressed herein by other terms such as a simulation or bounding box. The simulation box and its associated regions are described further below with respect to FIG. 7.

In step 420, the worker machines prepare or pre-process their respective portions of the IC design layout for simulation. For example, since each partitioned tile (or simulation box) may contain geometry content, each worker machine may receive geometry content in its respective tile (or simulation box) and then convert the geometry content to a pixelated representation, if desired. Although FIG. 4 shows pre-processing done by the worker machines, tiles may alternatively be pre-processed by the manager machine and then sent to the worker machines.

In some embodiments, the pre-processing may include steps such as rasterization and/or anti-aliasing filtering. Rasterization or pixelation refers to the task of taking an image described in a vector graphics format (e.g., including the polygonal shapes of the mask patterns) and converting it into a raster image that comprises pixels or dots. In the rasterization process, a high resolution rasterized image may be obtained. However, such a high resolution image may sometimes be unnecessary, in which case the high resolution rasterized mask is down-sampled to a lower resolution representation, which might include anti-aliasing filtering to limit the impact of aliasing on the lower resolution grid.

In some embodiments, each pre-processed tile comprises a plurality of pixels (or points or dots), such as a pixel 611 (discussed in more details below with respect to FIG. 6). Each pixel may represent a very small area of image (e.g., a square with an area of 0.1×0.1 nm^2, 1×1 nm nm^2, 10×10 nm^2, 50×50 nm^2, etc.). Each pixel has a set of coordinates (e.g., X-Y coordinates or polar coordinates) that defines its relative position within the image. Each pixel also has a pixel or image value. For example, a value of one may be given to a pixel fully or partially covered by a shape, and a value of zero may be given to a pixel not covered by any shape. In some cases, a weighted value between zero and one may also be given to a pixel if it is partially covered by a shape (e.g., value of 0.6 if 60% of the area in the pixel is covered by the shape). During computational lithography, changes in the image value of a pixel may signal edge movement or displacement of a geometric shape (e.g., a polygon edge) that covers the pixel. For example, edge displacement values or vertices may be derived by comparing how image values of pixels in a tile have changed. In some embodiments (e.g., when OPC manipulates geometric shapes directly without deriving them from pixel values), each pre-processed tile may comprise geometric shapes directly, and principles disclosed herein may work similarly in such embodiments.

After step 420, method 400 may enter a simulated imaging process 430 to simulate various stages of a lithography process. In some embodiments, simulated imaging process 430 is an iterative process, where each iteration includes multiple steps. For example, as shown in FIG. 4, each iteration of simulated imaging process 430 includes a mask update step 432 and multiple imaging steps such as imaging step 434 and imaging step 436. A modified design layout is generated at the end of each iteration. The iterations may repeat until a final modified design layout 450 is close enough in shape to satisfy design rules.

In step 432, each worker machine updates its respective portion of the IC design layout from previous simulation results to get a new layout. As shown in FIG. 4, simulation results obtained from step 436 may be used by the same worker machine to update an IC design layout for the next iteration. Step 432 may be skipped if simulation has not been conducted yet (e.g., in the first iteration). For example, in the first iteration, pixel values from an original IC design layout may be used for the next imaging step 434. Note that the calculation of mask update from simulation may be an inverse problem and computed by OPC or ILT.

Moreover, in step 432, each worker passes the values at the pre-determined pixels to its designated neighbors (following the message delivery instructions generated in step 410) in order to facilitate their computation in the next imaging step 434. For example, a first worker machine working on a first tile may deliver messages (sometimes denoted in drawings as "msg") to one or more second worker machines working on neighboring tiles. Messages are delivered according to delivery instructions, which are sent by the manager machine to the worker machines in step 410. The delivery instructions define which points or pixels go to which of the other worker machines interacting with it, thereby enabling the worker machines to exchange information with other worker machines in order to synchronize their simulation results.

The plurality of imaging steps—including the first imaging step 434, intermediate imaging steps (not shown in FIG. 4), and the last imaging step 436—represent how simulated imaging process 430 specifically simulates various stages of a lithography process. A lithography process involves various stages or steps such as mask fabrication, diffraction of light through the mask, projection of light through the lens system and onto the resist, resist exposure, post-exposure baking, development, etching, metal line formation, etc. Different images may be used or formed in the various stages of the lithography process, such as a mask image, an aerial image or optical image, and a photoresist or resist image. The stages (and images used therein) may be simulated in the forward order, e.g., for OPC, or additionally have the errors propagated backward in "reverse" order, e.g., for the computation of the gradient in ILT. In some embodiments, a standard forward lithography simulation may be computed step by step (e.g., n steps as shown in FIG. 4), where each step starts with an image and results in another image. Examples of images generated in such steps include a mask near field, an aerial image, and a resist image. Therefore, depending on the stage of simulation, an IC design layout being computed by simulated imaging process 430 may represent any of such images. Completion of these steps gives one full cycle of the forward simulation.

In some embodiments of simulated imaging process 430, step 434 applies a thin mask model to a processed mask layout, thereby generating a mask near field. The mask near field can be approximated by the thin mask model that assigns two different constant field values to areas occupied or not occupied by patterns, respectively. An intermediate step (not labeled in FIG. 4) applies an optical model to the mask near field, thereby generating an aerial image on the wafer. This step may also be viewed as performing an exposure simulation. Step 436 applies a photoresist model to the aerial image to obtain a final photoresist image on the wafer. This step may also be viewed as performing a photoresist simulation. More stages of lithography may be simulated if needed.

In parallel lithography simulation, in order to simulate a tile accurately, it is useful to simulate a larger surrounding region that may overlap with one or more neighboring tiles. As a result, for pixels located in the overlapping region, multiple pixel values may be computed for the same pixel by different worker machines. Without proper synchronization, the multiple pixel values for the same pixel may differ, leading to tile boundary inconsistencies. If boundary stitching is done at the very end of the simulation process, it may be too late to solve boundary inconsistencies because computed solutions may have already diverged significantly. In the present disclosure, to solve tile boundary inconsistencies and therefore improve the accuracy of lithography simulation, a worker machine may start each of a plurality of image steps with averaging pixel values from the worker machine itself (e.g., the result of a previous imaging step) and pixel values delivered from its tiling neighbors. In some embodiment, when computing the updated pixel value of a pixel, every weight for averaging is non-negative, and all contributing weights for the pixel sum up to one. Moreover, during each imaging step, each worker machine passes pixel values at the pre-determined pixels to its designated neighbors (following message delivery instructions generated in step 410) in order to facilitate their computation in the next imaging step.

Figure 6:
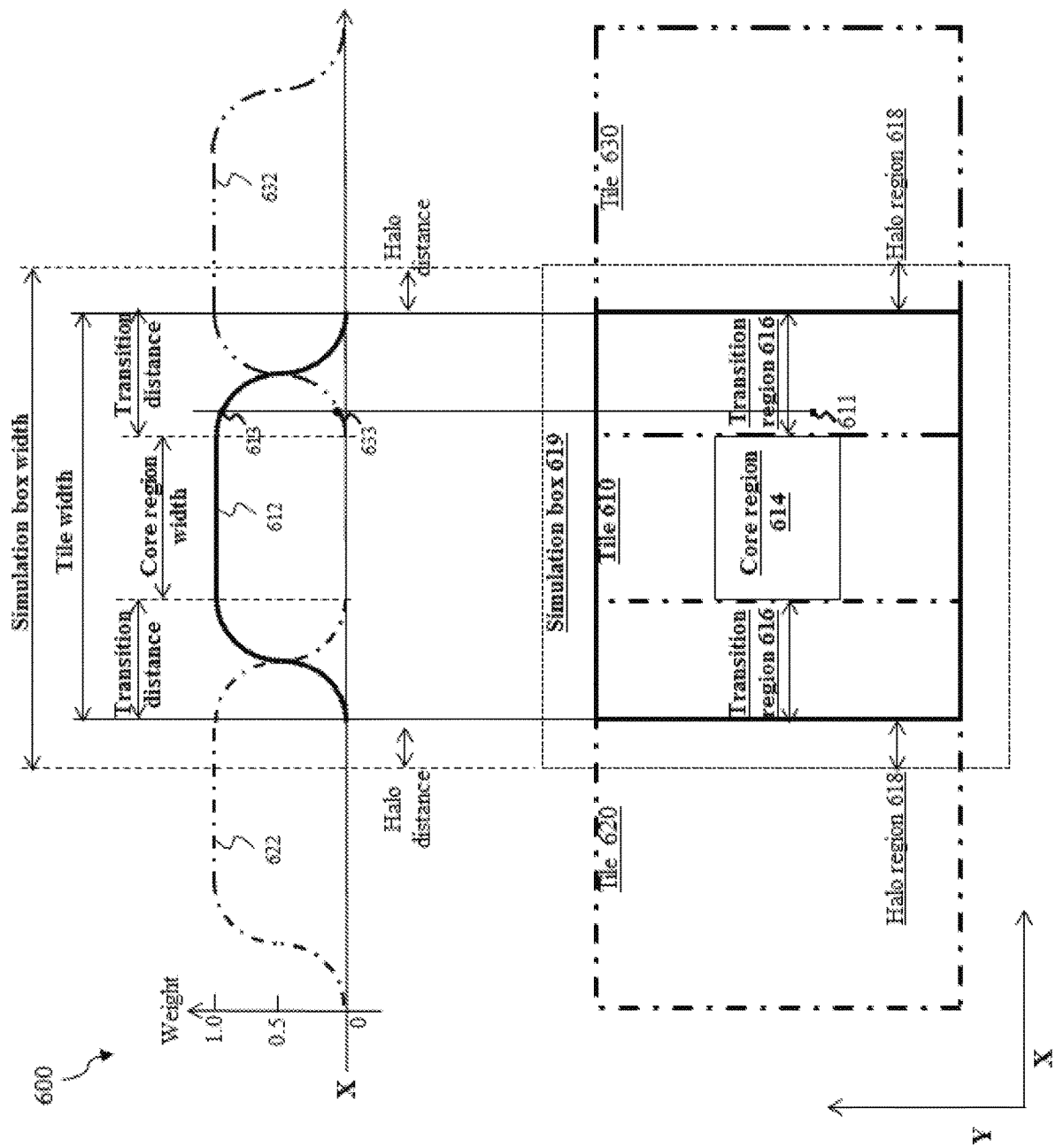
FIG. 6 is a schematic diagram showing a computation scheme according to various embodiments of the present disclosure.

Computation principles are further illustrated in FIG. 6, which is a schematic diagram showing a computation scheme 600. In FIG. 6, a first tile 610 is situated in the middle, with two neighboring tiles 620 and 630 located on both sides of tile 610. Tiles 610, 620, and 630 may be located anywhere on an IC design layout (e.g., any of the rows shown in FIG. 5A). Tile 610 may be labeled "tile i," tile 620 "tile i−1," and tile 630 "tile i+1," where i represents a number of the current tile. Tile 610 can have additional neighboring tiles in both the X-direction and Y-direction (for example, center tile in FIG. 5A has eight neighboring tiles), but for the sake of simplicity, they are not shown in FIG. 6. As described above, each of tiles 610, 620, and 630 comprises a plurality of pixels, and each pixel has a pixel value to be updated by simulated imaging process 430. For example, tile 610 includes a pixel 611 whose value may be changed by the execution of imaging steps 434 and 436.

In some embodiments, averaging pixel values of the same pixel from a worker machine itself and from its tiling neighbors is realized by the use of weight functions, which are designed for and assigned to each tile. As shown in FIG. 6, weight functions 612, 622, and 632 are designed for and assigned to tiles 610, 620, and 630, respectively. Weight functions 612, 622, and 632 are plotted along the X-direction because they are used to combine pixel values from tiles that are "neighbors" in the X-direction. Similar weight functions may be designed to combine pixel values from tiles that are "neighbors" in the Y-direction (e.g., from tile

610, upper tile, and lower tile which are not shown in FIG. 6). In some embodiments, weight functions 612, 622, and 632 are the same (e.g., if tiles 610, 620, and 630 have the same width in the X-direction). But weight functions 612, 622, and 632 may vary if needed (e.g., if tiles 610, 620, and 630 have different widths in the X-direction, or if one of tiles 610, 620, and 630 is further divided into subtiles). Each weight function specifies a series of weights (valued between zero and one), each corresponding to a pixel with the same X-coordinate value. For example, weight function 612 has a first weight 613 corresponding to pixel 611, and weight function 632 has a second weight 633 also corresponding to pixel 611.

Based on weight function profiles, several regions may be derived to associate with each tile (e.g., tile 610). Depending on the location of a pixel with respect to a weight function, the pixel may fall in different regions. For example, if a pixel is updated based on only results from tile 610, the pixel falls in a core region 614 (i.e., where weight function 612 equals one). Instead, if a pixel (e.g., pixel 611) is updated based on a weighted combination of pixel values from multiple contributing tiles including tile 610 and neighboring tiles, the pixel falls in a transition region 616 (i.e., where weight function 612 greater than zero but less than one). A rectangular area including both core region 614 and transition region 616 constitutes tile 610, since it represents a region for which tile 610's worker machine is responsible in terms of pixel updating. Otherwise, if a pixel is not to be updated by tile 610 (but its value is needed to accurately simulate other pixels in transition region 616 or core region 614), the pixel falls in a halo region 618 (i.e., where weight function 612 equals zero). Values of pixels located in halo region 618 are not transmitted to neighboring tiles (alternatively, values of pixels located in halo region 618 may be transmitted to neighboring titles but such values are to be given a weight of zero by the neighboring tiles). An overall rectangular area including, from inside out, core region 614, transition region 616, and halo region 618 constitutes a simulation box 619 (sometimes referred to as a bounding box, a marker, or a frame). In some embodiments, simulation box 619 is the job unit assigned to a worker machine since simulation box 619 contains all intrinsic pixel values the worker machine needs to have in order to process its respective portion of the IC design layout. In this sense, the concept of tile 610 may be captured equivalently by simulation box 619. For example, when a rectangular simulation box 619 is assigned to a worker machine by a manager machine, the manager machine may simply define or identify simulation box 619 by the coordinates of its four corners. Weight function 612 would specify the rest of regions associated with simulation box 619.

In order to generate consistent simulation results for overlapping regions, the sum of the weights—each with a value greater than zero but less than one—associated to each contributing tile for the same pixel equals about one (e.g., 1, 1.01, 1.001, 1.0005, 0.99, 0.999, 0.9995, etc.) Note that the weights may add up to a different number and then rescaled to about one. This may be referred to as "partition of unity." Therefore, a weight function may be associated with each tile (e.g., tile 610) so that $W_i=0$ outside its transition region (e.g., transition region 616), $=1$ inside its core region, and $\Sigma W_i(x, y)=1$ inside its transition region.

In some embodiments, a weighted combination for a pixel located at coordinates (x, y) may be computed using equation:

$$P_{update}(x, y) = \sum_{i=1}^{k} W_i(x, y) P_i(x, y),$$

where $P_{update}(x, y)$ denotes an updated pixel value of the pixel based on a weighted combination;

$P_i(x, y)$ denotes a previous pixel value of the pixel generated by contributing tile i;

$W_i(x, y)$ denotes a weight of the pixel according to weight function and k denotes a number of contributing tiles (including the current tile and neighboring tiles) whose transition regions cover the pixel at (x, y).

Figure 7:
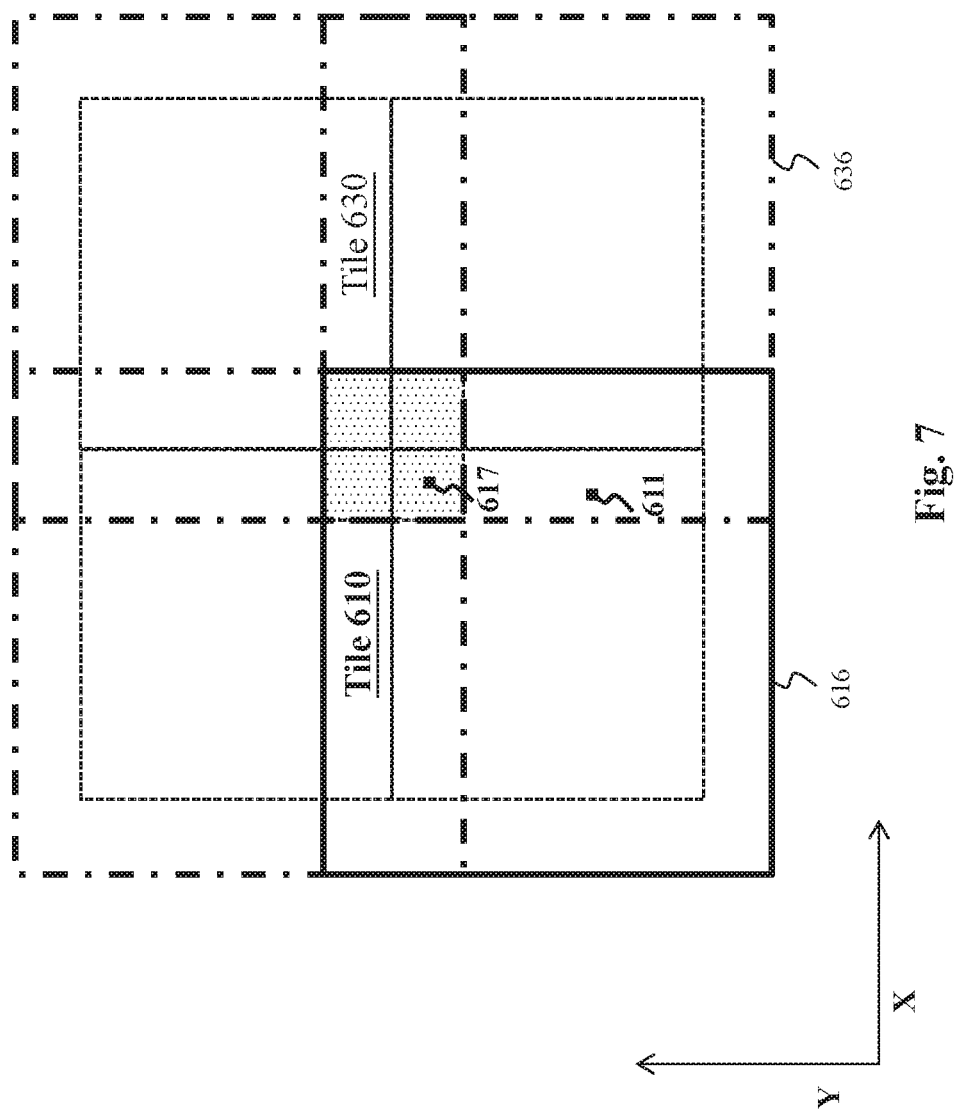
FIG. 7 is a schematic diagram illustrating how transition regions of neighboring tiles overlap according to various embodiments of the present disclosure.

FIG. 7 is a schematic diagram illustrating how transition regions of neighboring tiles overlap. Depending on where a pixel is located, the pixel may be covered by a different number of transition regions. For example, pixel 611 is covered by transition regions 616 and 636 of two neighboring tiles (i.e., tiles 610 and 630), respectively. Therefore, weights 613 and 633—which are to be multiplied by values of pixel 611—add up to about one. As shown in FIG. 6, weight 613 is about 0.9, and weight 633 is about 0.1. However, another pixel 617 located near a corner of transition region 616 is covered by four neighboring tiles. Therefore, four weights—which are to be multiplied by values of pixel 617—add up to one. Note that, since tiles may be flexibly partitioned herein (see FIGS. 5A-5C), a pixel may be covered by any suitable number of transition regions. Consequently, a pixel may be updated based on a weighted combination of any suitable number of pixel values from contributing tiles.

Note that, in FIG. 6 and FIG. 7, the tiles (or simulation boxes) and their associated regions may have any suitable sizes. For example, simulation box 619 may have a size of about 3×3 μm^2, 5×10 μm^2, 10×10 μm^2, 10×25 μm^2, 50×50 μm^2, etc. In such cases, simulation box 619 would have in the X-direction a simulation box width of about 3 μm, 5 μm, 10 μm, 50 μm, etc. A halo distance—between boundaries of tile 610 and simulation box 619—may be set to any suitable value (e.g., 0.3 μm, 1 μm, 2 μm, etc.). The rest of region sizes may be determined by corresponding weight functions, which may be designed using any suitable means. For example, in the X-direction, the width of core region 614 and the width of tile 610 are both determined by weight function 612. A transition distance separates core region 614 and tile 610. The transition distance defines the overlapping distance between tiles 610 and 630. In some embodiments, the middle-point of one side of the transition region 616 may be defined as the point where weight functions 612 and 632 intersect. As shown in FIG. 6, weight functions 612 and 632 intersect where their weights are both valued at 0.5. Note that the values of weight functions 612 and 632 may be adjusted depending on how many weight functions overlap at a certain point. The profile of weight function 612 over the transit distance may or may not be symmetrical about both sides of core region 614. As a specific example, in terms of size in the X-direction, core region 614 may have a width of about 29 μm; tile 610 may have a width of about 35 μm, including a transit distance of about 3 μm on either side of core region 614; and simulation box 619 may have a width of about 37 μm, including a halo distance of about 1 μm on either side of tile 610.

The synchronized parallel tile computation techniques disclosed herein may intrinsically remove tile boundary inconsistencies. For example, suppose manager machine 310 assigns first and second simulation boxes to worker machines 320 and 330 for performing simulated imaging process 430. The first and second simulation boxes—associated with tiles 610 and 630, respectively—overlap in a region that includes a pixel or point with a set of coordinates (e.g., transition regions 616 and 636 both include pixel 611 at coordinates (x, y)). In some embodiments, in a first imaging step (e.g., step 432), worker machine 320 may compute a first image value (A) of pixel 611, and worker machine 330 may compute a second image value (B) of pixel 611. Further, in the first imaging step, worker machines 320 and 330 may exchange image values A and B with each other. Then, in a second imaging step, worker machine 320 may compute a third image value (C) of pixel 611 based on a weighted combination of image values A and B, for example, using equation: C=A*(weight 613)+B*(weight 633). Also in the second imaging step, worker machine 330 may compute a fourth image value (D) of pixel 611 based on the same weighted combination of image values A and B, for example, using equation: D=A*(weight 613)+B*(weight 633). The two equations show that image values C and D have equal value. In other words, both worker machines 320 and 330 are able to generate identical image values for the same pixel in the same imaging step, even though their computations are executed separately and independently. Tile boundary inconsistency is therefore removed. In implementations, although image values C and D may not match perfectly due to various factors (e.g., differences in computation algorithms or capabilities of worker machines, model inaccuracies, communication errors, etc.), the potential divergence between images values C and D is significantly reduced.

As another advantage, since each tile uses results obtained in a previous step (but not current step), tile ordering becomes irrelevant to boundary stitching treatment. For example, tiles 610 and 630 may be processed in either order in the same imaging step without impacting the results of the final output. That said, the synchronization techniques disclosed herein can also be run on one CPU, with one tile simulated after another. In such a case, tiles may still be symmetrically combined so that the tile order does not impact the final output.

Figure 8:
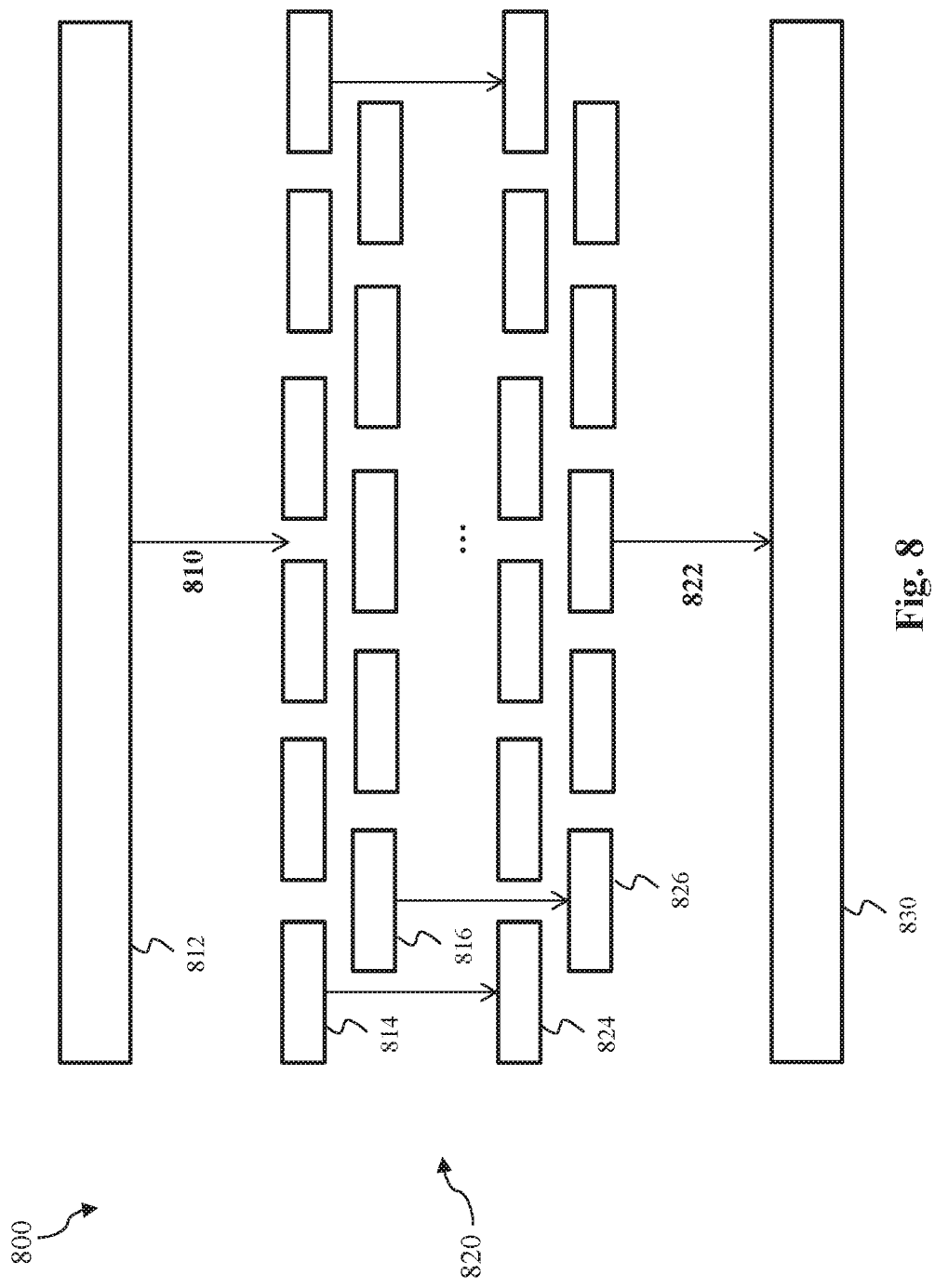
FIG. 8 is a schematic diagram illustrating part of a synchronized parallel tile computation scheme according to various embodiments of the present disclosure.

FIG. 8 is a schematic diagram illustrating part of a synchronized parallel tile computation scheme 800, which may be used in simulated imaging process 430. In tiling step 810, a manager machine receives and partitions an IC design layout 812 into a plurality of tiles including 814 and 816. In imaging step 820 (e.g., same as imaging step 434), tiles are simulated or updated. For example, tiles 814 and 816 are transformed into tiles 824 and 826, respectively, by updating image values contained therein (but coordinates of the tiles remain the same). For example, a mask image or near field may be transformed to an optical image. As described above, simulation of tiles involves using weighted combinations of previous simulation results generated by different tiles. Moreover, imaging step 820 includes synchronization process 822 to synchronize image values from the plurality of tiles via data exchange between neighboring tiles. Specifically, pixel values located in overlapping regions of neighboring tiles are exchanged to synchronize simulation results from such neighboring tiles. During computational lithography, changes in pixel values are converted to displacement values to reflect edge movement of associated geometries or shapes. As a result, a full modified IC design layout 830 may be stitched together from all tiles. For example, modified IC design layout 830 may represent an optical image. Modified IC design layout 830 may be stored in a manager machine and used for the next imaging step (or the next iteration of simulated imaging process 430). Alternatively, due to the nature of distributed processing by multiple worker machines, modified IC design layout 830 may not be physically stored in the memory of a single CPU or single device, but rather may be distributed among many worker machines with synchronized images (i.e. identical data in overlapped regions with no tile boundary issues). Therefore, whether or not stored in multiple machines, modified IC design layout 830 is effectively a synchronized image (e.g., a virtual synchronized image).

In scheme 800, imaging step 820 may be repeated in each following imaging step until modified IC design layout 830 satisfies design rules. In that sense, data is continuously exchanged between tiles and stitched. For example, during standard forward imaging or verification, each forward image may be synchronized, and then CD may be measured at appropriate gauges. In some embodiments, optical images are synchronized, and then various resist images (such as gradient, quenching, etc.) are also synchronized. During OPC, an initial mask, the Jacobian, and edge movements may be synchronized at each stage. During ILT, an initial mask, wafer image, and the gradient may be synchronized at each stage. When modified IC design layout 830 satisfies design rules, final synchronized image values may be combined or stitched together from the plurality of tiles by the manager machine. The final modified IC design layout may then be used for mask fabrication.

Figure 9:
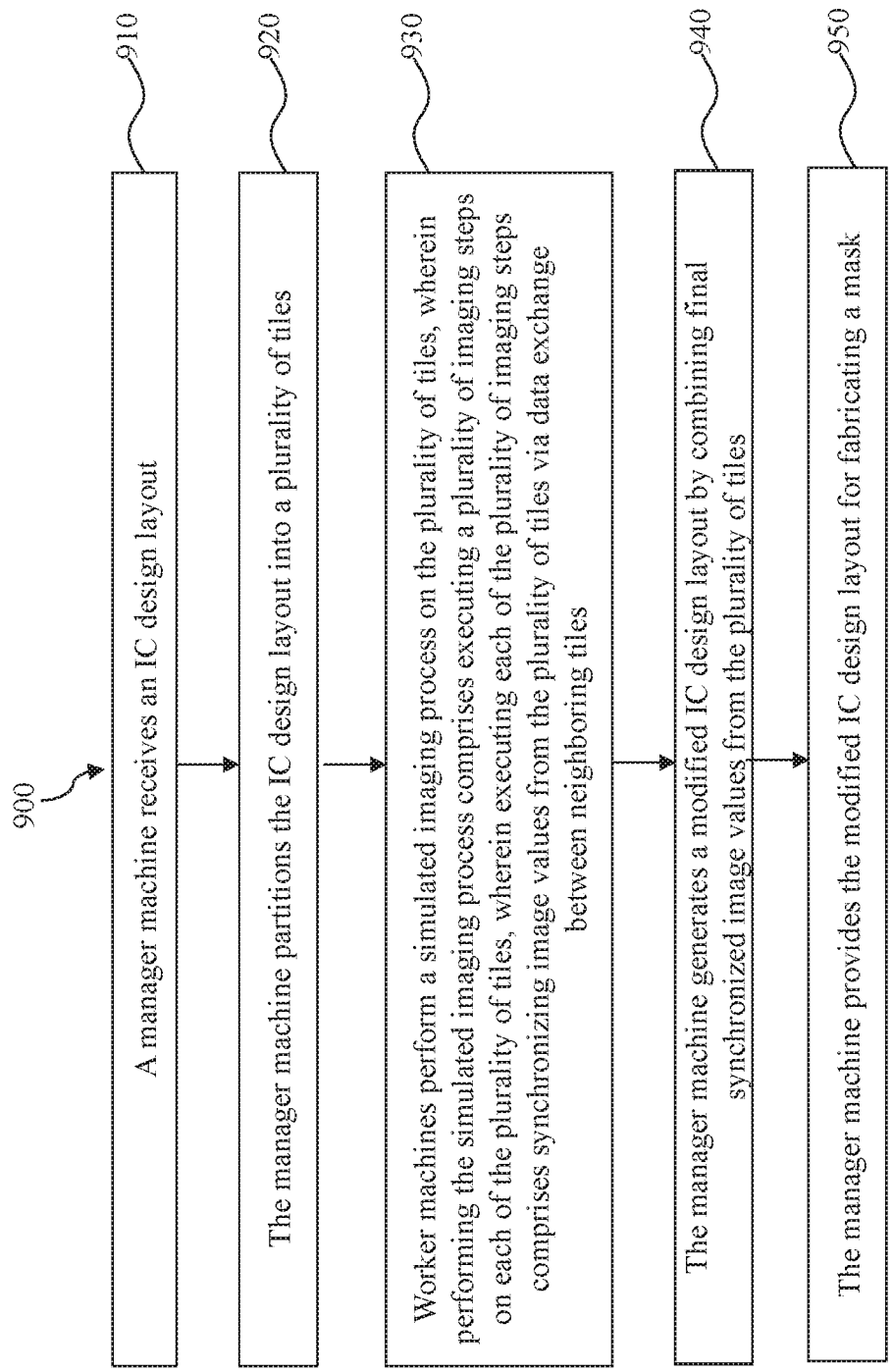
FIG. 9 is a flowchart of a computational lithography method according to various embodiments of the present disclosure.

FIG. 9 is a flowchart of a computational lithography method 900 according to various embodiments of the present disclosure. Computational lithography method 900 may be implemented by IC manufacturing system 10 of FIG. 1, where design house 15, mask house 20, and/or IC manufacturer 25 can perform (or collaborate to perform) computational lithography method 900 to manufacture IC device 30. For example, lithography method 900 may modify an IC design layout using synchronized parallel processing by a manger machine (e.g., manger machine 310) and multiple worker machines (e.g., worker machines 320 and 330), as described above. FIG. 9 has been simplified for the sake of clarity. It is understood that additional steps can be provided before, during, and after the method 900 and that some of the steps described can be replaced or eliminated for other embodiments of the method 900. Unless otherwise noted, the processes of the method 900 may be performed in any order including concurrently.

In step 910, the manager machine receives an IC design layout. In step 920, the manager machine partitions the IC design layout into a plurality of tiles. The manager machine may further assign the plurality of tiles to the worker machines for simulation. In step 930, the worker machines perform a simulated imaging process (e.g., simulated imaging process 430) on the plurality of tiles. Pre-processing may be done before the simulated imaging process. Performing the simulated imaging process comprises executing a plurality of imaging steps (e.g., imaging steps 434 and 436) on each of the plurality of tiles. Further, executing each of the plurality of imaging steps comprises synchronizing image values from the plurality of tiles via data exchange between neighboring tiles. In some embodiments, the simulated imaging process is an iterative process used in OPC or ILT, and each iteration of the iterative process includes the plurality of imaging steps. Method further comprises repeatedly performing the iterative process until the modified IC design layout satisfies pre-set design rules.

In some embodiments, the neighboring tiles include a first tile (e.g., tile 610) and a second tile (e.g., tile 630) that neighbors the first tile. The first tile is associated with a first transition region (e.g., transition region 616), and the second tile is associated with a second transition region (e.g., transition region 636). An overlapping area of the first transition region and the second transition region includes a pixel (e.g., pixel 611). The pixel has a first image value previously computed by the first tile and a second image value previously computed by the second tile. Executing an imaging step on the first tile comprises computing an updated image value of the pixel based on a weighted combination (using weights 613 and 633) of the first image value of the pixel and the second image value of the pixel. The data exchange between the neighboring tiles in the imaging step comprises delivering the updated image value of the pixel from the first tile to the second tile. In some embodiments, the weighted combination includes a first weight (e.g., weight 613) multiplied by the first image value and a second weight (e.g., weight 633) multiplied by the second image value. A sum of the first weight and the second weight is greater than zero but equal to or less than one.

In some embodiments, the imaging step executed on the first tile is a first imaging step (e.g., step 434), and the plurality of imaging steps further includes a second imaging step that follows the first imaging step. Here, executing the second imaging step on the second tile comprises computing a second updated image value of the pixel based on the weighted combination of (a) the updated image value of the pixel delivered to the second tile and (b) a third image value of the pixel computed by the second tile in the first imaging step.

Method 900 is intended to solve IC fabrication issues. In step 940, the manager machine generates a modified IC design layout by combining final synchronized image values from the plurality of tiles. In step 950, the manager machine provides the modified IC design layout for fabricating a mask.

Figure 10:
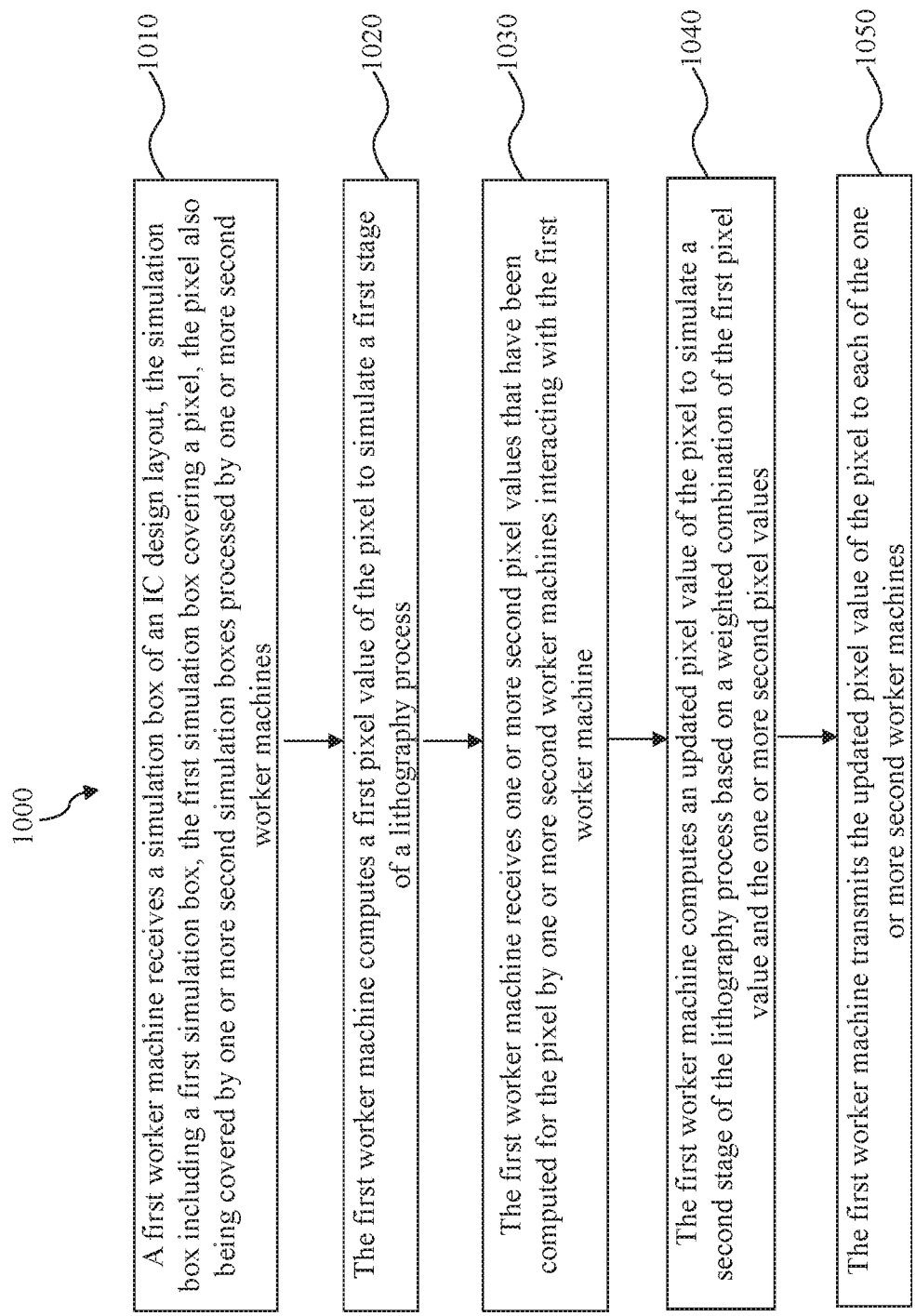
FIG. 10 is a flowchart of another computational lithography method according to various embodiments of the present disclosure.

FIG. 10 is a flowchart of a computational lithography method 1000 according to various embodiments of the present disclosure. Computational lithography method 1000 may be implemented by IC manufacturing system 10 of FIG. 1. For example, lithography method 1000 may be implemented by a worker machine (e.g., worker machine 320 or 330) to modify a portion of an IC design layout. FIG. 10 has been simplified for the sake of clarity. It is understood that additional steps can be provided before, during, and after the method 1000 and that some of the steps described can be replaced or eliminated for other embodiments of the method 1000. Unless otherwise noted, the processes of the method 1000 may be performed in any order including concurrently.

In step 1010, a first worker machine receives a simulation box of an IC design layout (e.g., simulation box 619). The simulation box includes a first transition region (e.g., transition region 616). The first transition region covers a pixel (e.g., pixel 611), which is also covered by one or more second transition regions processed by one or more second worker machines. In step 1020, the first worker machine computes a first pixel value of the pixel to simulate a first stage of a lithography process. The lithography process involves various stages or steps such as mask fabrication, radiation projection, resist exposure, post-exposure etching, and metal line formation. Different images are formed in the various stages of the lithography process, such as a mask image, an optical image, and a photoresist or resist image. In step 1030, the first worker machine receives one or more second pixel values that have been computed for the pixel by one or more second worker machines interacting with the first worker machine. The one or more second worker machines may have computed the second pixel values also to simulate the first stage of the lithography process. In step 1040, the first worker machine computes an updated pixel value of the pixel to simulate a second stage of the lithography process based on a weighted combination of the first pixel value and the one or more second pixel values. In some embodiments (e.g., for OPC), the first updated pixel value of the pixel may represent an optical image value at the pixel, and the second updated pixel value of the pixel may represent a resist image value at the pixel. In other embodiments (e.g., for ILT), the first updated pixel value of the pixel may represent a wafer image value at the pixel, and wherein the second updated pixel value of the pixel may represent a gradient value at the pixel. In step 1050, the first worker machine transmits the updated pixel value of the pixel to each of the one or more second worker machines.

As described above, the parallel computing architecture disclosed herein treats a large IC design layout as a whole. Although an underlying tiling scheme is still used, simulation results are combined smoothly and symmetrically from each tile into a single larger simulation domain. Since a simulated imaging process has multiple steps that produce intermediate results, the disclosed computing architecture stages the computation in such a manner that the intermediate results can be synchronized before simulation proceeds to the next step, thereby effectively eliminating tile boundary inconsistencies at each step. Functionally, such synchronization is equivalent to performing the simulated imaging process on the single, larger area of IC design layout. Therefore, the present disclosure provides an effective and efficient solution to lithography simulation for a large area of mask layout. Such a solution can be used for lithography simulation and computation where an iterative solver (e.g., OPC and ILT) is used in a parallel computing environment.

The parallel computing architecture disclosed herein may achieve appreciable gain in simulation efficiency. As a first example, in a flat IC design layout without meaningful pattern repetitions, assume each tile is included in a 32×32 $\mu m^2$ simulation domain. Assume a halo distance of about 1 $\mu m$ based purely on model considerations. Using techniques disclosed herein, a total transit distance may be about or less than 3 $\mu m$. It is estimated that, in an OPC simulation, the reduction in transit distance (from 6 $\mu m$ to 3 $\mu m$) compared to other approaches may result in an efficiency gain of about 24%. As a second example, assume each tile is included in a 16×16 $\mu m^2$ simulation domain, and assume a halo distance of about 0.3 $\mu m$ based purely on model considerations. It is estimated that, in an OPC simulation, the reduction in transit distance (from 1.5 $\mu m$ to 0.3 $\mu m$) compared to other approaches may result in an efficiency gain of about 10%. The use of smaller halos (e.g., size is only limited by model considerations) also improves efficiency of large area simulation.

The efficiency gain achieved herein may be especially helpful for certain tiling schemes. For example, in a staggered tiling scheme (e.g., staggered tiling scheme 550) which is useful for hotspot fixing, non-rectangular regions (tiles or simulation boxes) may be simulated efficiently with minimal tiles. Efficiency gain in this case can be enormous, especially for complicated hotspot areas. Additionally, continuous hotspot areas may be handled simultaneously by multiple worker machines without requiring any freezing of features. In general, the tile synchronization techniques disclosed have benefits regardless of the tiling scheme. By freezing features (e.g., in full-chip OPC), the system is restricted in terms of its degrees of freedom to optimize a mask. The present disclosure places limited if any restrictions (e.g., no such restrictions in cases such as hotspot fixing), thereby resulting in better convergence of computation results, particularly near tile boundaries. In addition, the synchronization techniques disclosed herein may be selectively incorporated into existing frameworks, e.g., by implementing them on larger tiles. The disclosed tiling schemes may be combined with conventional schemes to gain efficiency if simultaneously treating an entire design layout may be prohibitive on available computational resources. While such a partial implementation may not eliminate boundary stitching issues, it does reduce its frequency of occurrence.

Thus, the present disclosure provides examples of synchronized parallel tile computation methods for IC fabrication. In some examples, a method comprises receiving an IC design layout, partitioning the IC design layout into a plurality of tiles, performing a simulated imaging process on the plurality of tiles, wherein performing the simulated imaging process comprises executing a plurality of imaging steps on each of the plurality of tiles, wherein executing each of the plurality of imaging steps comprises synchronizing image values from the plurality of tiles via data exchange between neighboring tiles. The method further comprises generating a modified IC design layout by combining final synchronized image values from the plurality of tiles, and providing the modified IC design layout for fabricating a mask.

In some such examples, the neighboring tiles include a first tile and a second tile that neighbors the first tile. An overlapping area of the first tile and the second tile includes a pixel, and the pixel has a first image value previously computed by the first tile and a second image value previously computed by the second tile. Executing an imaging step on the first tile comprises computing an updated image value of the pixel based on a weighted combination of the first image value of the pixel and the second image value of the pixel. The data exchange between the neighboring tiles in the imaging step comprises delivering the updated image value of the pixel from the first tile to the second tile. In some such examples, the weighted combination includes a first weight multiplied by the first image value and a second weight multiplied by the second image value, and a sum of the first weight and the second weight is greater than zero but equal to or less than one. In some such examples, the imaging step executed on the first tile is a first imaging step, and the plurality of imaging steps further includes a second imaging step that follows the first imaging step. Here executing the second imaging step on the second tile comprises computing a second updated image value of the pixel based on the weighted combination of (a) the updated image value of the pixel delivered to the second tile and (b) a third image value of the pixel computed by the second tile in the first imaging step. In some such examples, the simulated imaging process is an iterative process used in OPC or ILT, and each iteration of the iterative process includes the plurality of imaging steps. Here the method further comprises repeatedly performing the iterative process until the modified IC design layout satisfies pre-set conditions.

In further examples, a system comprises a manager machine interacting with a plurality of worker machines including first and second worker machines interacting with the manager machine. The manager machine is configured to receive an IC design layout, partition the IC design layout into a plurality of simulation boxes including first and second simulation boxes, assign the first and second simulation boxes to the first and second worker machines, respectively, for performing a simulated imaging process including first and second imaging steps. Here an overlapping region of the first and second simulation boxes includes a point with a set of coordinates. The first and second worker machines are configured to: in the first imaging step, compute image value A of the point using the first worker machine and image value B of the point using the second worker machine; in the first imaging step, exchange image value A and image value B with each other; and in the second imaging step, compute image value C of the point using the first worker machine and image value D of the point using the second worker machine. The computation of both image value C and image value D is based on a weighted combination of image value A and image value B.

In some such examples, the weighted combination of image value A and image value B uses a first weight multiplied by image value A and a second weight multiplied by image value B, and wherein a sum of the first and second weights equals one. In some such examples, image value C of the point computed using the first worker machine and image value D of the point computed using the second worker machine are equal. In some such examples, the first and second worker machines are further configured to send image value C of the point and image value D of the point to the manager machine. In some such examples, the manager machine is further configured to generate a modified IC design layout based in part on image value C of the point and image value D of the point, and provide the modified IC design layout for fabricating a lithography mask based on the modified IC design layout.

In further examples, a method for lithography simulation comprises receiving a simulation box of an IC design layout by a first worker machine. The simulation box includes a first transition region, the first transition region covers a pixel, and the pixel is also covered by one or more second transition regions processed by one or more second worker machines. The method further comprises computing a first pixel value of the pixel to simulate a first stage of a lithography process, receiving one or more second pixel values that have been computed for the pixel by the one or more second worker machines interacting with the first worker machine, and computing an updated pixel value of the pixel to simulate a second stage of the lithography process based on a weighted combination of the first pixel value and the one or more second pixel values.

In some such examples, the weighted combination uses a plurality of weights, each multiplied by one of the first pixel value and the one or more second pixel values in computing the updated pixel value. Here a sum of the plurality of weights equals one. In some such examples, the method further comprises transmitting the updated pixel value of the pixel to each of the one or more second worker machines. In some such examples, the method further comprises receiving the IC design layout by a manager machine interacting with the first worker machine and with the one or more second worker machines, partitioning, by the manager machine, the IC design layout into a plurality of simulation boxes including the simulation box, assigning by the manager machine the simulation box to the first worker machine for simulation, and sending, from the manager machine to the first worker machine, message delivery instructions that specify how the updated pixel value of the pixel is to be transmitted to each of the one or more second worker machines. In some such examples, the updated pixel value of the pixel is a first updated pixel value that is computed by the first worker machine in a first imaging step. The method further comprises, in a second imaging step that follows the first imaging step: receiving one or more third pixel values that have been generated for the pixel in the first imaging step by the one or more second worker machines, and computing a second updated pixel value of the pixel based on a weighted combination of the first updated pixel value and the one or more third pixel values. In some such examples, the first imaging step and the second imaging step are used for OPC, where the first updated pixel value of the pixel represents an optical image value at the pixel, and where the second updated pixel value of the pixel represents a resist image value at the pixel. In some such examples, the first imaging step and the second imaging step are used for ILT, where the first updated pixel value of the pixel represents a wafer image value at the pixel, and where the second updated pixel value of the pixel represents a gradient value at the pixel. In some such examples, the method further comprises generating a modified IC design layout based in part on the second updated pixel value, and providing the modified IC design layout for fabricating a lithography mask based on the modified IC design layout. In some such examples, the weighted combination of the first pixel value and the one or more second pixel values is specified by one or more weighting functions, wherein each weighting function accords (a) a weight of one to an core region of the simulation box, (b) weights between zero and one to the transition region, and (c) a weight of zero to a halo region of the simulation box. In some such examples, the simulation box further includes a core region surrounded by the transition region and a halo region surrounding the transition region. Here the method further comprises computing updated pixel values of a plurality of pixels in the core region by using only pixel values that have been generated for the plurality of pixels by the first worker machine, while not using any previous pixel values generated for the plurality of pixels by the one or more second worker machines. Computing the updated pixel value of the pixel is further based on additional pixels located in the halo region. Values of the additional pixels located in the halo region are not transmitted by the first worker machine to any of the one or more second worker machines.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method for integrated circuit (IC) fabrication, the method comprising:
    receiving an IC design layout;
    partitioning the IC design layout into a plurality of tiles;
    performing a simulated imaging process on the plurality of tiles, wherein performing the simulated imaging process comprises executing a plurality of imaging steps on each of the plurality of tiles, wherein executing each of the plurality of imaging steps comprises synchronizing image values from the plurality of tiles via data exchange between neighboring tiles;
    generating a modified IC design layout by combining final synchronized image values from the plurality of tiles; and
    providing the modified IC design layout for fabricating a mask.

2. The method of claim 1, wherein the neighboring tiles include a first tile and a second tile that neighbors the first tile, wherein an overlapping area of the first tile and the second tile includes a pixel, wherein the pixel has a first image value previously computed by the first tile and a second image value previously computed by the second tile, wherein the executing of an imaging step on the first tile comprises computing an updated image value of the pixel on the first tile based on a weighted combination of the first image value of the pixel and the second image value of the pixel, and wherein the data exchange between the neighboring tiles in the imaging step comprises delivering the updated image value of the pixel from the first tile to the second tile.

3. The method of claim 2, wherein the weighted combination includes a first weight multiplied by the first image value and a second weight multiplied by the second image value, and wherein a sum of the first weight and the second weight is greater than zero but equal to or less than one.

4. The method of claim 3, wherein the executing of the plurality of imaging steps on the pixel includes executing each of the plurality of imaging steps on the pixel using the same first weight and the same second weight.

5. The method of claim 2, wherein the first image value is previously computed by applying a lithography processing model by the first tile, and the second image value is previously computed by applying the lithography processing model by the second tile.

6. The method of claim 2, wherein the imaging step executed on the first tile is a first imaging step, and the plurality of imaging steps further includes a second imaging step that follows the first imaging step, wherein executing of the second imaging step on the second tile comprises computing a second updated image value of the pixel based on the weighted combination of (a) the updated image value of the pixel delivered to the second tile and (b) a third image value of the pixel computed by the second tile in the first imaging step.

7. The method of claim 2, wherein the combining of the final synchronized image values includes, after the executing of a last imaging step of the plurality of imaging steps, combining a weighted combination of a final updated image value for the pixel computed on the first tile and a final updated image value for the pixel computed on the second tile with a final synchronized image value of another pixel of the overlapping area.

8. The method of claim 1, wherein the simulated imaging process is an iterative process used in optical proximity correction (OPC) or inverse lithography technology (ILT), and each iteration of the iterative process includes the plurality of imaging steps, the method further comprising repeatedly performing the iterative process until the modified IC design layout satisfies pre-set conditions.

9. The method of claim 1, wherein the partitioning, generating, and providing includes partitioning, generating and providing by a manager machine, and the performing includes performing by worker machines, the worker machines being different from the manager machine.

10. A method for integrated circuit (IC) fabrication, the method comprising:
    receiving an IC design layout;
    partitioning the IC design layout into a plurality of tiles;
    synchronizing image values of a first pixel at a first imaging step between two tiles of the plurality of tiles to obtain a first synchronized image value of the first pixel, the first pixel in an overlapped region between the two tiles;

computing image values of the first pixel at a second imaging step based on the first synchronized image value of the first pixel by the two tiles;

synchronizing the images values of the first pixel at the second imaging step between the two tiles to obtain a second synchronized image value of the first pixel;

generating a modified IC design layout by combining the second synchronized image value of the first pixel with a third synchronized image value of a second pixel of the plurality of tiles; and providing the modified IC design layout for fabricating a mask.

11. The method of claim 10, wherein the synchronizing of the image values of the first pixel at the first imaging step includes:

sending a first image value of the first pixel at the first imaging step by a first tile of the two tiles to a second tile of the two tiles, and receiving a second image value of the first pixel at the first imaging step by the first tile from the second tile;

computing a first weighted combination of the first image value of the first pixel at the first imaging step and the second image value of the first pixel at the first imaging step to obtain the first synchronized image value of the first pixel; and wherein the synchronizing of the image values of the first pixel at the second imaging step includes:

sending a first image value of the first pixel at the second imaging step by the first tile to the second tile, and receiving a second image value of the first pixel at the first imaging step by the first tile from the second tile; and computing a second weighted combination of the first image value of the first pixel at the second imaging step and the second image value of the first pixel at the second imaging step to obtain the second synchronized image value of the first pixel.

12. The method of claim 11, wherein the computing of the first weighted combination includes multiplying the first image value of the first pixel at the first imaging step by a first weight, and multiplying the second image value of the first pixel at the first imaging step by a second weight, wherein the computing of the second weighted combination includes multiplying the first image value of the first pixel at the second imaging step by the first weight, and multiplying the second image value of the first pixel at the second imaging step by the second weight, and wherein a sum of the first weight and the second weight is greater than zero but equal to or less than one.

13. The method of claim 10, wherein the computing of the image values of the first pixel at the second imaging step includes applying a lithography processing model to the first synchronized image value of the first pixel at the two tiles.

14. The method of claim 10, further comprising computing a first image value of a third pixel by a first tile of the two tiles but not by a second tile of the two tiles, the third pixel being in the first tile but outside the overlapped region.

15. The method of claim 14, wherein the computing of the image values of the first pixel at the second imaging step includes applying a lithography processing model to the first synchronized image value of the first pixel by the two tiles, the method further comprising computing a second image value of the third pixel by applying the lithography processing model to the first image value of the third pixel by the first tile.

16. The method of claim 15, wherein the second pixel is outside the first tile and outside the second tile, and wherein the generating of the modified IC design layout includes combining the second synchronized image value of the first pixel with the third synchronized image value of the second pixel, and with the second image value of the third pixel.

17. A method for integrated circuit (IC) fabrication, the method comprising:

receiving an IC design layout;

partitioning the IC design layout into a plurality of tiles;

synchronizing image values from the plurality of tiles;

generating a modified IC design layout by combining final synchronized image values; and providing the modified IC design layout for fabricating a mask.

18. The method of claim 17, wherein the synchronizing provides a first synchronized image value of a pixel in an overlapped region between a first tile of the plurality of tiles and a second tile of the plurality of tiles, the method further comprising:

simulating a first imaging process on the first tile based on the first synchronized image value to obtain a first updated image value;

simulating the first imaging process on the second tile based on the first synchronized image value to obtain a second updated image value; and synchronizing the first updated image value and the second updated image value to obtain a second synchronized image value, wherein the combining of the final synchronized image values includes combining the second synchronized image value.

19. The method of claim 17, wherein the synchronizing includes:

exchanging the image values between a first tile of the plurality of tiles and a second tile of the plurality of tiles that neighbors the first tile, wherein an overlapping area of the first tile and the second tile includes a pixel, wherein the pixel has a first image value of the image values previously computed by the first tile and a second image value of the image values previously computed by the second tile, computing an updated image value of the pixel on the first tile based on a weighted combination of the first image value of the pixel and the second image value of the pixel, and delivering the updated image value of the pixel from the first tile to the second tile.

20. The method of claim 19, wherein the weighted combination includes a first weight multiplied by the first image value and a second weight multiplied by the second image value, and wherein a sum of the first weight and the second weight is greater than zero but equal to or less than one, wherein the synchronizing is a first synchronizing on the pixel, the method further comprising a second synchronizing on the pixel, the second synchronizing includes computing based on the first weight and the second weight.

* * * * *